United States Patent
Schuster

(10) Patent No.: US 10,415,224 B2
(45) Date of Patent: *Sep. 17, 2019

(54) SEALS FOR CLOSET COLLARS

(71) Applicant: Danco, Inc., Irving, TX (US)

(72) Inventor: Michael J. Schuster, Shorewood, IL (US)

(73) Assignee: Danco, Inc., Irving, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/791,950

(22) Filed: Oct. 24, 2017

(65) Prior Publication Data

US 2018/0044904 A1 Feb. 15, 2018

Related U.S. Application Data

(63) Continuation of application No. 15/407,620, filed on Jan. 17, 2017, now Pat. No. 9,816,261, which is a
(Continued)

(51) Int. Cl.
| | | |
|---|---|---|
| *E03D 11/16* | (2006.01) | |
| *E03D 11/17* | (2006.01) | |
| *F16L 5/10* | (2006.01) | |

(52) U.S. Cl.
CPC .............. *E03D 11/16* (2013.01); *E03D 11/17* (2013.01); *F16L 5/10* (2013.01); *Y10T 29/49826* (2015.01)

(58) Field of Classification Search
CPC ....................................................... E03D 11/16
See application file for complete search history.

(56) References Cited

U.S. PATENT DOCUMENTS

| | | |
|---|---|---|
| 1,333,368 A | 3/1920 | Auer |
| 2,427,431 A | 9/1947 | Wieland |
| | (Continued) | |

FOREIGN PATENT DOCUMENTS

| | | |
|---|---|---|
| BR | 102013031190 | 4/2016 |
| CA | 2137033 | 5/1996 |
| | (Continued) | |

OTHER PUBLICATIONS

Invalidity Contentions of Lavelle Industries, Inc. in the litigation case of *Dance, Inc.* v. *Lavelle Industries, Inc.*, Civil Action No. 5:16-CV-00048-CMC mailed on Oct. 11, 2016.
(Continued)

*Primary Examiner* — Janie M Loeppke
(74) *Attorney, Agent, or Firm* — Thomas Horstemeyer, LLP

(57) ABSTRACT

In various embodiments, an apparatus includes a toilet horn receptacle having an upper end and a lower end. A sealing rim is positioned at an upper end of the toilet horn receptacle, and at least a portion of the sealing rim extends inwardly from the upper end of the toilet horn receptacle towards a center axis of the sealing rim. A funnel extends from the lower end of the toilet horn receptacle, and a channel wall circumscribes the toilet horn receptacle. The channel wall and at least the toilet horn receptacle form a continuous annular receptacle. A foam sealing component is disposed in the continuous annular receptacle such that an inner wall of the foam sealing component circumscribes the toilet horn receptacle and such that the channel wall circumscribes at least a portion of an outer wall of the foam sealing component.

20 Claims, 20 Drawing Sheets

Related U.S. Application Data continuation of application No. 13/974,918, filed on Aug. 23, 2013, now Pat. No. 9,758,957.

(56) References Cited

U.S. PATENT DOCUMENTS

| | | | |
|---|---|---|---|
| 2,750,216 A | 12/1953 | Thies |
| 2,908,513 A | 10/1956 | Karlinski |
| 2,976,543 A | 3/1961 | Smyth et al. |
| 3,224,014 A | 12/1965 | Pietrzak |
| 3,238,538 A | 3/1966 | Turner |
| 3,349,412 A | 10/1967 | Schwartz |
| 3,400,411 A | 9/1968 | Harvey |
| 3,501,172 A | 3/1970 | Pickard |
| 3,821,820 A | 7/1974 | Thompson |
| 3,952,340 A | 4/1976 | Cuschera |
| 4,090,267 A | 5/1978 | Cuschera |
| 4,237,667 A | 12/1980 | Pallucci |
| 4,406,480 A | 9/1983 | Izzi |
| 4,482,161 A | 11/1984 | Izzi, Sr. |
| 4,502,166 A | 3/1985 | Brown |
| 4,515,398 A | 5/1985 | Machon |
| 5,018,224 A | 5/1991 | Hodges |
| 5,185,890 A | 2/1993 | Dismore |
| 5,219,619 A | 6/1993 | Trouve et al. |
| 5,377,361 A | 1/1995 | Piskula |
| 5,432,957 A | 7/1995 | Fernie et al. |
| 5,695,222 A | 12/1997 | Hodges |
| 5,862,533 A | 1/1999 | Johnson et al. |
| 6,332,632 B1 | 12/2001 | Hodges |
| 6,519,784 B2 | 2/2003 | Carwile |
| 6,581,214 B1 | 6/2003 | Love et al. |
| 6,644,670 B2 | 11/2003 | Etcheverry |
| 6,691,331 B2 | 2/2004 | Gallacher et al. |
| 6,694,537 B2 | 2/2004 | Telles |
| 6,719,294 B2 | 4/2004 | Nguyen et al. |
| 6,745,408 B2 | 6/2004 | Spells, Sr. |
| 6,789,275 B2 | 9/2004 | Spells et al. |
| 6,883,187 B2 | 4/2005 | Cornwall |
| 7,069,603 B2 | 7/2006 | Flushing |
| D574,931 S | 8/2008 | Hughes |
| 7,584,970 B2 | 9/2009 | Ponce |
| 7,814,580 B2 | 10/2010 | Coronado et al. |
| 8,069,502 B2 | 12/2011 | Coronado |
| 8,099,801 B2 | 1/2012 | Hughes |
| D656,591 S | 3/2012 | Miller et al. |
| 8,671,470 B2 | 3/2014 | Miller et al. |
| 8,875,320 B2 | 11/2014 | Peñúñuri et al. |
| 8,955,172 B2 | 2/2015 | Culwell |
| 9,062,445 B2 | 6/2015 | Duncan et al. |
| 9,512,605 B2 | 12/2016 | Duncan |
| 9,556,603 B2 | 1/2017 | Guthrie |
| 9,663,934 B2 | 5/2017 | Duncan |
| 9,816,261 B2 | 11/2017 | Schuster |
| 10,017,932 B2 | 7/2018 | Mehari |
| 10,100,505 B2 | 10/2018 | Coronado |
| 10,151,095 B2 | 12/2018 | Coronado et al. |
| 10,280,606 B1 | 5/2019 | Smith |
| 10,294,647 B2 | 5/2019 | Fong et al. |
| 2001/0023505 A1 | 9/2001 | Atkins |
| 2001/0040348 A1 | 11/2001 | Kojima |
| 2003/0009820 A1 | 1/2003 | Telles |
| 2003/0052461 A1 | 3/2003 | Ponce |
| 2003/0126676 A1 | 7/2003 | Gallecher et al. |
| 2004/0098798 A1 | 5/2004 | Atkins et al. |
| 2004/0128752 A1 | 7/2004 | Atkins et al. |
| 2004/0163165 A1* | 8/2004 | Ortiz .................. E03D 11/16 4/252.5 |
| 2005/0108814 A1 | 5/2005 | Thompson |
| 2005/0278841 A1 | 8/2005 | Coronado et al. |
| 2006/0225195 A1 | 10/2006 | Scholer |
| 2007/0256220 A1 | 11/2007 | Lee et al. |
| 2009/0119826 A1 | 5/2009 | Coronado |
| 2009/0165195 A1 | 7/2009 | Atkins et al. |
| 2010/0037376 A1 | 2/2010 | Hughes |
| 2010/0123307 A1 | 5/2010 | Coronado |
| 2011/0094024 A1 | 4/2011 | Grech |
| 2011/0185487 A1 | 8/2011 | Miller |
| 2011/0185488 A1 | 8/2011 | Miller |
| 2014/0062035 A1 | 3/2014 | Coronado et al. |
| 2014/0366256 A1 | 12/2014 | Coronado |
| 2017/0321410 A1 | 11/2017 | Connell |
| 2019/0003170 A1 | 1/2019 | Loggia et al. |
| 2019/0085548 A1 | 3/2019 | Guthrie |

FOREIGN PATENT DOCUMENTS

| | | |
|---|---|---|
| CA | 2578327 | 8/2008 |
| CN | 2931606 | 8/2007 |
| CN | 106836429 | 6/2017 |
| CN | 107044163 | 8/2017 |
| DE | 2205532 | 8/1973 |
| DE | 2525203 | 12/1976 |
| EP | 1054112 | 11/2000 |
| EP | 1655528 | 10/2006 |
| EP | 3336268 | 6/2018 |
| GB | 1512600 | 6/1978 |
| GB | 1531449 | 11/1978 |
| GB | 2012902 | 8/1979 |
| GB | 1567326 | 5/1980 |
| GB | 2136905 | 9/1984 |
| JP | 7331726 | 12/1995 |
| JP | 2010007286 | 1/2010 |
| KR | 200388701 | 7/2005 |
| KR | 100841718 | 6/2008 |
| KR | 20090109601 | 10/2009 |
| KR | 20100007292 | 7/2010 |
| KR | 20110027239 | 3/2011 |
| KR | 101038117 | 5/2011 |
| KR | 101971165 | 4/2019 |
| KR | 101975327 | 5/2019 |
| WO | 0125556 | 4/2001 |
| WO | 0132996 | 5/2001 |
| WO | 0198595 | 12/2001 |
| WO | 2014016703 | 1/2014 |
| WO | 2016054771 | 4/2016 |

OTHER PUBLICATIONS

E-mail to Attorney Culbertson dated Sep. 12, 2016 in the litigation case of *Dance, Inc.* v. *Lavelle Industries, Inc.*, Civil Action No. 5:16-CV-00048-CMC.

Petition for Inter Partes Review under 35 U.S.C. 311-319 and 37 CFR 42.100, et, seq. filed on Oct. 28, 2016 in the *Lavelle Industries, Inc.* v. *Dance, Inc.* case, United States Patent and Trademark Office before the Patent Trial and Appeal Board for U.S. Pat. No. 9,273,455.

Defendant, Lavelle Industries, Inc's Answer, Affirmative Defenses and Counterclaims to Dance, Inc.'s Complaint for Patent Infringement filed on Aug. 8, 2016 in Case No. 5: 16-CV-00048-CMC, Eastern District of Texas, Texarkana Division.

[Proposed] Order Denying Danco, Inc.'s Motion to Dismiss/Strike Defendant's Inequitable Counterclaim/Affirmative Defense for Failure to State a Claim filed Mar. 31, 2017 in the litigation case of *Danco, Inc.* v. *Lavelle Industries, Inc.*, civil Action No. 5:16-CV-00048-CMC.

Defendant Lavelle Industries, Inc.'s Proposed Second Amended Answer, Affirmative Defenses, and Counterclaims to Danco, Inc.'s Complaint for Patent Infringement filed Mar. 31, 2017 in the litigation case of *Danco, Inc.* v. *Lavelle Industries, Inc.*, Civil Action No. 5:16-CV-00048-CMC.

Lavelle Industries, Inc.'s Response to Danco, Inc.'s Motion to Dismiss/Strike Defendant's Inequitable Counterclaim/Affirmative Defense for Failure to State a Claim filed Mar. 31, 2017 in the litigation case of *Danco, Inc.* v. *Lavelle Industries, Inc.*, Civil Action No. 5:16-CV-00048-CMC.

Defendant, Lavelle Industries, Inc.'s Amended Answer, Affirmative Defenses and Amended Counterclaim to Danco, Inc.'s Complaint for Patent Infringement filed Feb. 28, 2017 in the litigation case of *Danco, Inc.* v. *Lavelle Industries, Inc.*, Civil Action No. 5:16-CV-00048-CMC.

(56) References Cited

OTHER PUBLICATIONS

U.S. Appl. No. 13/974,918, filed Aug. 23, 2013, Notice of Allowance dated Aug. 8, 2017.
U.S. Appl. No. 13/974,918, filed Aug. 23, 2013, Response to Non-Final Office Action dated Apr. 7, 2016.
U.S. Appl. No. 13/974,918, filed Aug. 23, 2013, Non-Final Office Action dated Apr. 7, 2016.
U.S. Appl. No. 13/974,918, filed Aug. 23, 2013, Response to Final Office Action dated Jan. 20, 2016.
U.S. Appl. No. 13/974,918, filed Aug. 23, 2013, Final Office Action dated Jan. 20, 2016.
U.S. Appl. No. 13/974,918, filed Aug. 23, 2013, Response to Non-Final Office Action dated Jun. 12, 2015.
U.S. Appl. No. 13/974,918, filed Aug. 23, 2013, Non-Final Office Action dated Jun. 12, 2015.
U.S. Appl. No. 14/693,472, filed Apr. 22, 2015, Notice of Allowance dated Aug. 18, 2017.
U.S. Appl. No. 14/693,472, filed Apr. 22, 2015, Response to Non-Final Office Action dated Mar. 18, 2016.
U.S. Appl. No. 14/693,472, filed Apr. 22, 2015, Non-Final Office Action dated Mar. 18, 2016.
U.S. Appl. No. 14/693,472, filed Apr. 22, 2015, Response to Final Office Action dated Jan. 20, 2016.
U.S. Appl. No. 14/693,472, filed Apr. 22, 2015, Final Office Action dated Jan. 20, 2016.
U.S. Appl. No. 14/693,472, filed Apr. 22, 2015, Response to Non-Final Office Action dated Jul. 20, 2015.
U.S. Appl. No. 14/693,472, filed Apr. 22, 2015, Non-Final Office Action dated Jul. 20, 2015.
Canadian Application No. 2,806,916 Examination Report dated Dec. 17, 2018.
U.S. Appl. No. 15/407,620, filed Jan. 17, 2017, Notice of Allowance dated Jun. 30, 2017.
U.S. Appl. No. 13/771,773, filed Feb. 20, 2013, Non-Final Office Action dated Dec. 4, 2015.
U.S. Appl. No. 13/771,773, filed Feb. 20, 2013, Response to Non-Final Office Action dated Dec. 4, 2015.
U.S. Appl. No. 13/771,773, filed Feb. 20, 2013, Non-Final Office Action dated Oct. 25, 2016.
U.S. Appl. No. 13/771,773, filed Feb. 20, 2013, Response to Non-Final Office Action dated Oct. 25, 2016.
U.S. Appl. No. 13/771,773, filed Feb. 20, 2013, Non-Final Office Action dated Jun. 14, 2018.
U.S. Appl. No. 13/771,773, filed Feb. 20, 2013, Response to Non-Final Office Action dated Jun. 14, 2018.
U.S. Appl. No. 14/488,804, filed Sep. 17, 2014, Non-Final Office Action dated May 21, 2015.
U.S. Appl. No. 14/488,804, filed Sep. 17, 2014, Response to Non-Final Office Action dated May 21, 2015.
U.S. Appl. No. 14/488,804, filed Sep. 17, 2014, Notice of Allowance dated Jan. 29, 2016.
U.S. Appl. No. 14/693,584, filed Apr. 22, 2015, Non-Final Office Action dated Dec. 3, 2015.
U.S. Appl. No. 14/693,584, filed Apr. 22, 2015, Response to Non-Final Office Action dated Dec. 3, 2015.
U.S. Appl. No. 14/693,584, filed Apr. 22, 2015, Non-Final Office Action dated Dec. 14, 2016.
U.S. Appl. No. 14/693,584, filed Apr. 22, 2015, Response to Non-Final Office Action dated Dec. 14, 2016.
U.S. Appl. No. 14/693,584, filed Apr. 22, 2015, Non-Final Office Action dated Jun. 5, 2018.
U.S. Appl. No. 14/693,584, filed Apr. 22, 2015, Response to Non-Final Office Action dated Jun. 5, 2018.
U.S. Appl. No. 14/693,584, filed Apr. 22, 2015, Final Office Action dated Dec. 27, 2018.
U.S. Appl. No. 14/693,584, filed Apr. 22, 2015, Notice of Appeal filed Mar. 26, 2019.
U.S. Appl. No. 15/944,442, filed Apr. 3, 2018, Restriction Requirement dated Aug. 2, 2018.
U.S. Appl. No. 15/944,442, filed Apr. 3, 2018, Response to Restriction Requirement dated Aug. 2, 2018.
U.S. Appl. No. 15/944,442, filed Apr. 3, 2018, Non-Final Office Action dated Dec. 20, 2018.
Elastic Toilet Gasket (Wax Free) with Toilet Bolts Included-EG1002—The Home Depot Date. (https://www.homedepot.com/p/Elastic-Toilet-Gasket-Wax-Free-with-Toilet-Bolts-Included-EG) Access Date: Jul. 15, 2019.
BlueSeal Toilet Donut Seal Ring—Superior to Standard Wax Rings—Ends Toilet Base Leaking and $ubfloor Damage—Amazon.com. Date First Available: Jan. 2, 2017 (https://www.amazon.com/BlueSeal-Toilet-Donut-Seal-Ring/dp/B00MQAT3UA) Access Date: Jul. 15, 2019.
Fernco Inc. Available Fernco FTS-3 3-Inch Wax Free Toilet Seal—Wax Gasket—Amazon.com. Date First Available: May 3, 2006. (https://www.amazon.com/Fernco-Available-FTS-3-3-Inch-Toilet/dp/B000BQUJEA/ref=pd_rhf) Access Date: Jul. 15, 2019.
Sticky Elastomer Toilet Gasket Kit with Extension and Bolts-TFK-123—The Home Depot.(https://www.homedepot.com/p/Sticky-Elastomer-Toilet-Gasket-Kit-with-Extension-and-Bolts) Access Date: Jul. 15, 2019.
Fernco Inc. FTS-4 Wax Free Toilet Seal, 4-Inch, Iron—Toilet and Urinal Parts—Amazon.com. Date First Available: Feb. 17, 2007. (https://www.amazon.com/Fernco-Inc-FTS-4-Toilet-4-Inch/dp/B000BVMZUG/ref=pd_sbs_60_) Access Date: Jul. 15, 2019.
EasyDrain Ref. 030706-424 Soft Rubber Universal Better Than Wax Toilet seat Seal, Wax-Free Toilet Bowl Gasket—Amazon.com. Date First Available: Oct. 4, 2017 (https://www.amazon.com/dp/B07666QBYS/ref=sspa_dk_detail_4?psc=1) Access Date: Jul. 15, 2019.
Plumbcraft 7140300 Seal Tight Waxless Gasket Kit-Universal FIT Any Toilet—Amazon.com. Date First Available: Sep. 7, 2016. (https://www.amazon.com/dp/B01LQIH3XQ/ref=psdc_3226967011_t3_B00NOD4R7M) Access Date: Jul. 15, 2019.
Korky 6000BP Universal Toilet WaxFree Seal with Hardware—Toilet Installation Made Easy—Made in USA—Amazon.com. Date First Available: Sep. 18, 2014 (https://www.amazon.com/Korky-6000BP-Universal-WaxFree-Hardware/dp/B00NOD4R7M/re) Access Date: Jul. 15, 2019.
Fluidmaster 7530P8 Universal Better Than Wax Toilet Seal, Wax-Free Toilet Bowl Gasket—Amazon.com. Date First Available: Dec. 19, 2014. (https://www.amazon.com/Fluidmaster-7530P8-Universal-Better-Wax-Free/dp/ B00R7D35TQ/r) Access Date: Jul. 15, 2019.
Sani Seal Llc BL01 Waxless Toilet Gasket—Toilet Wax Seal—Amazon.com. Date First Available: Dec. 4, 2010 (https://www.amazon.com/Sani-BL01-Waxless-Toilet-Gasket/dp/B005K89RQU/ref=pd_cp_60) Access Date: Jul. 15, 2019.

* cited by examiner

SEALS FOR CLOSET COLLARS

CROSS-REFERENCE TO RELATED APPLICATIONS

This application is a continuation of, and claims priority to and the benefit of, U.S. Non-Provisional patent application Ser. No. 15/407,620 entitled "SEALS FOR CLOSET COLLARS" filed on Jan. 17, 2017, which is a continuation of U.S. Non-Provisional patent application Ser. No. 13/974,918 filed on Aug. 23, 2013. This application is also related to U.S. Non-Provisional patent application Ser. No. 13/771,773 filed on Feb. 20, 2013, U.S. Provisional Patent Application 61/600,794 filed on Feb. 20, 2012, and U.S. Provisional Patent Application 61/667,377 filed on Jul. 2, 2012. Each of these applications is incorporated by reference herein in its entirety.

BACKGROUND

A closet collar facilitates a connection between a toilet and a drain pipe. The closet collar may retain bolts that are used to fasten the toilet to the floor. Due to various circumstances, the closet collar may be installed at various levels with respect to the top surface of the floor. As a result, it may be difficult to install a toilet without a leaky seal.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

Figure 1A:
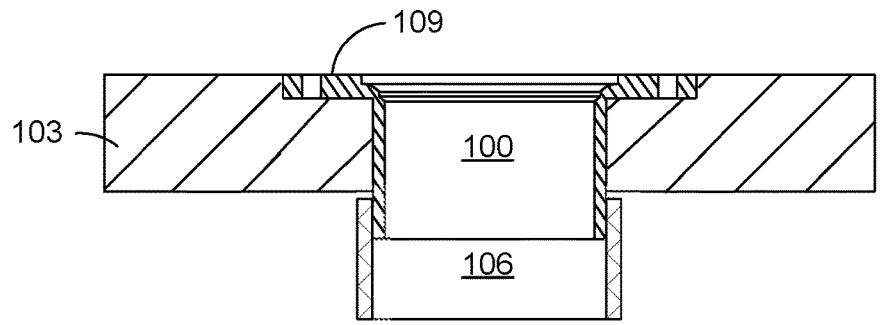
FIGS. 1A-1C are drawings of closet collar installations according to various embodiments of the present disclosure.
Figure 1B:
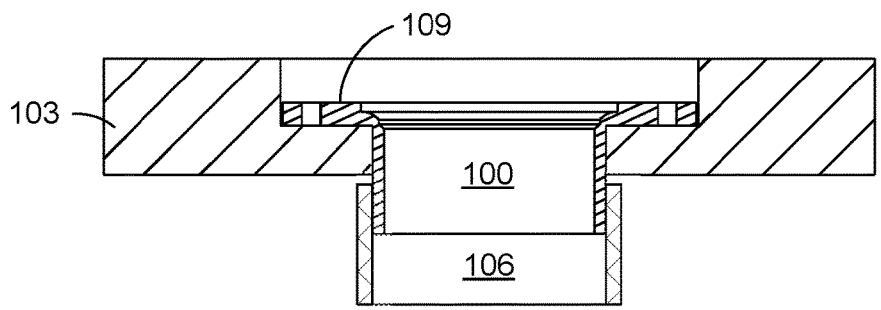
Figure 1C:
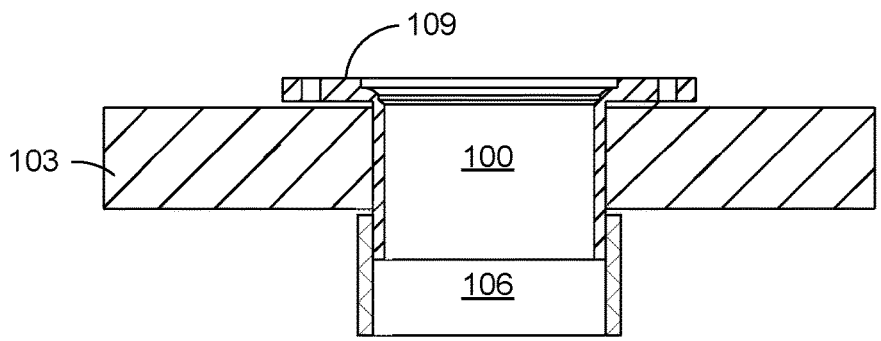

19A-19B are drawings of a twelfth example of a sealing assembly for one or more of the closet collar installations of FIGS. 1A-1C according to various embodiments of the present disclosure.

Figure 19A:
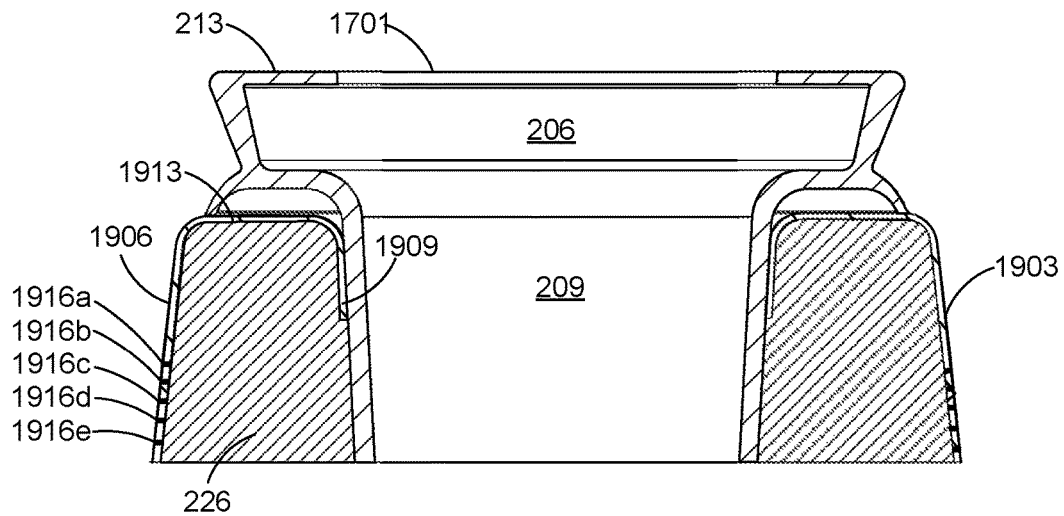
Figure 19B:
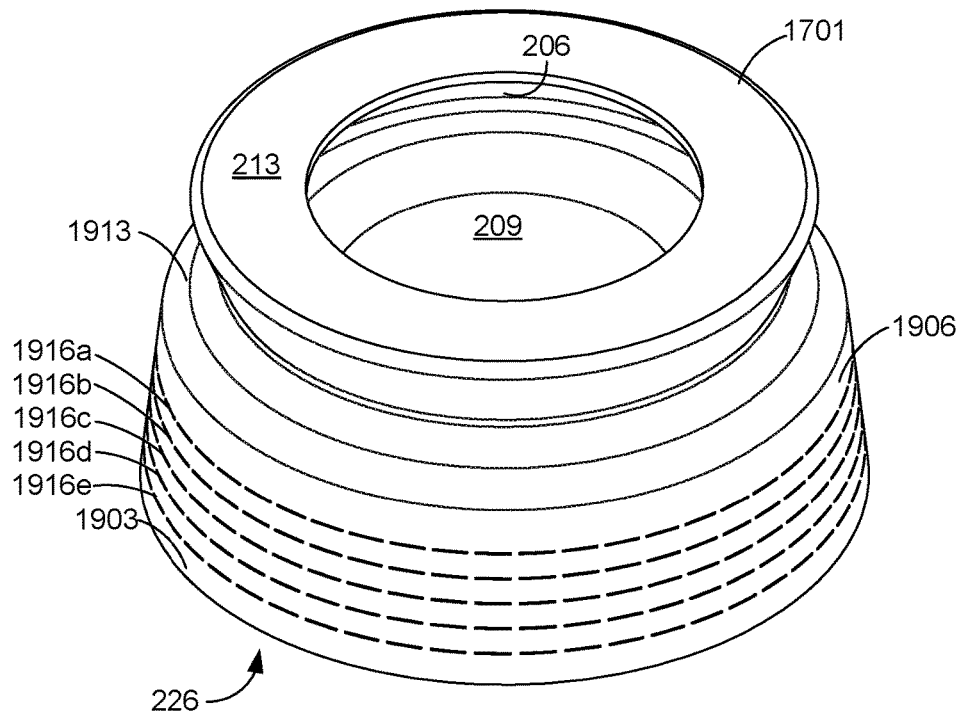
Figure 20A:
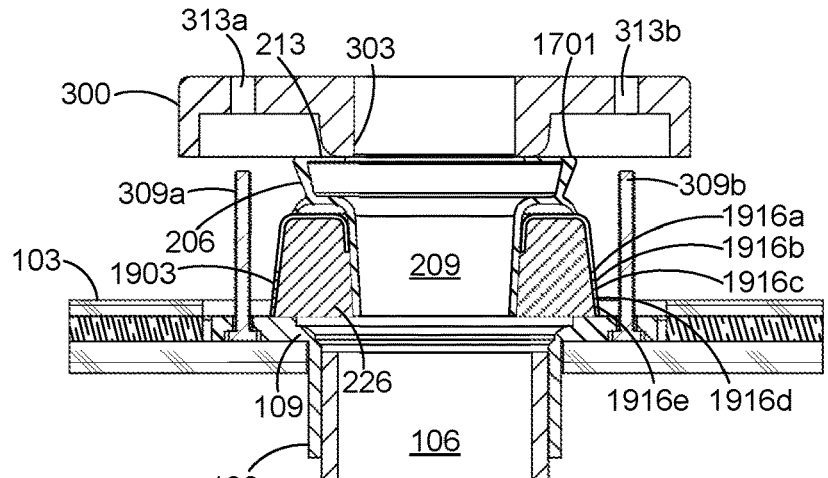
Figure 20B:
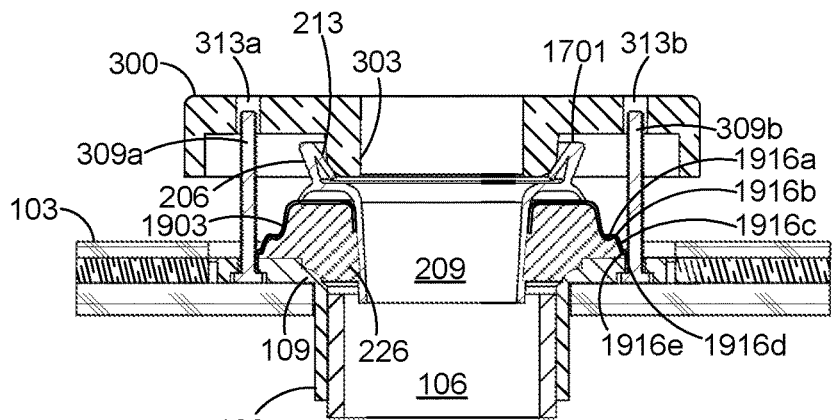
Figure 20C:
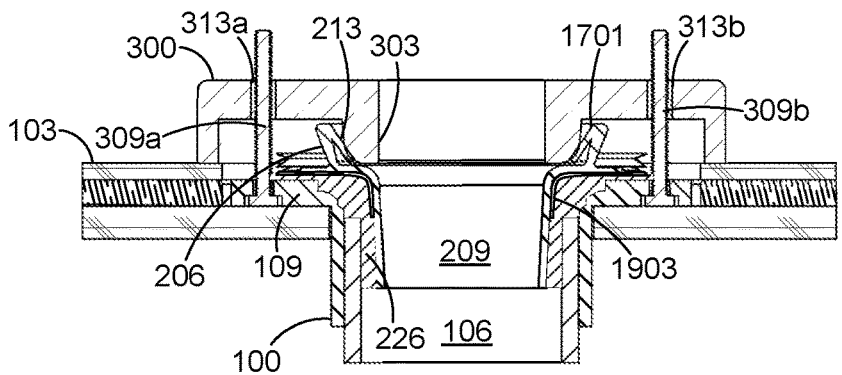

FIGS. 20A-20C are drawings depicting an installation of the sealing assembly of FIGS. 19A-19B according to various embodiments of the present disclosure.

Figure 21A:
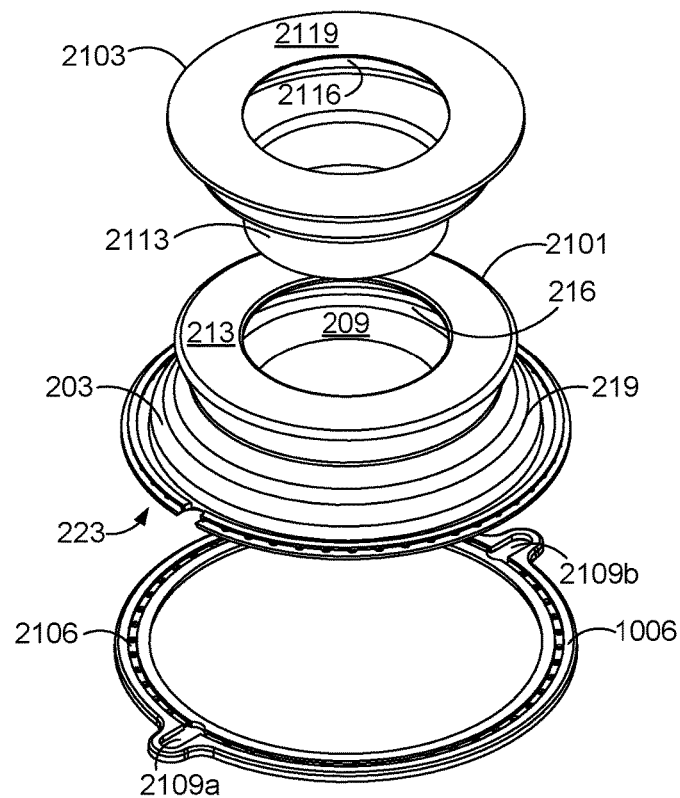
Figure 21B:
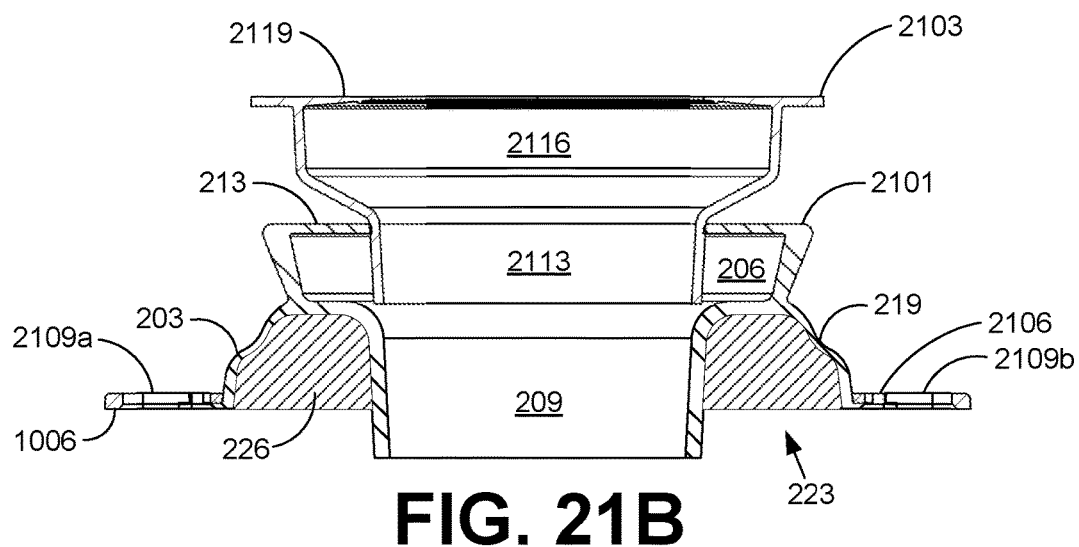

FIGS. 21A-21B are drawings depicting a thirteenth example of a sealing assembly for one or more of the closet collar installations of FIGS. 1A-1C according to various embodiments of the present disclosure.

Figure 22A:
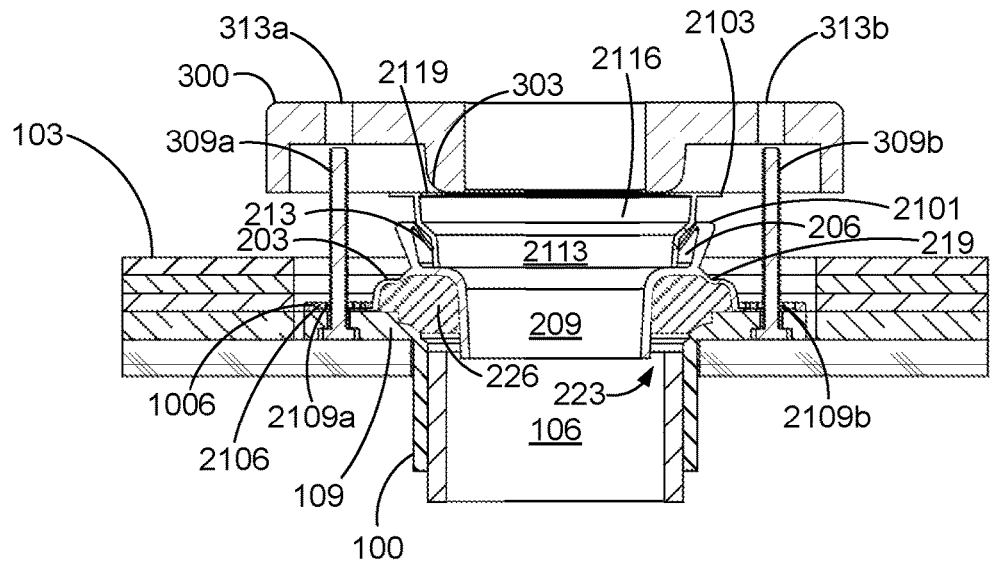
Figure 22B:
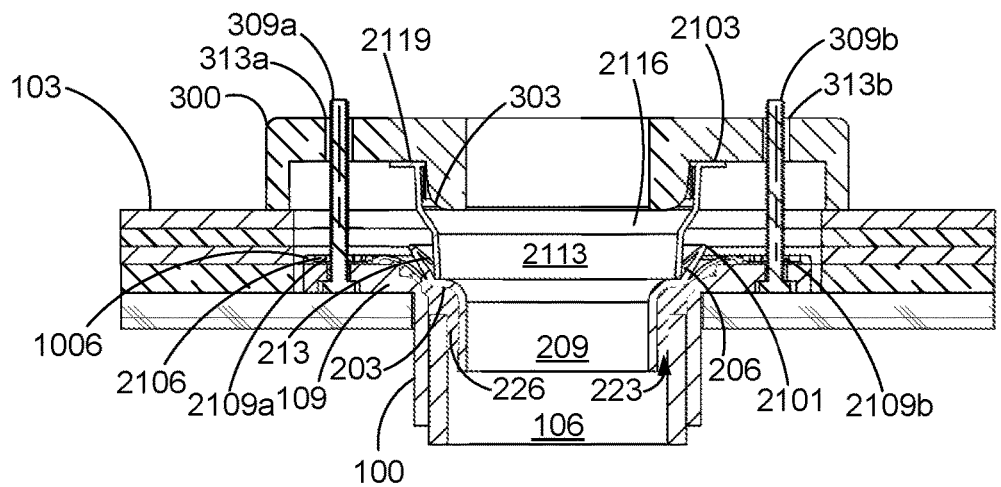

FIGS. 22A-22B are drawings depicting an installation of the sealing assembly of FIGS. 21A-21B according to various embodiments of the present disclosure.

Figure 23:
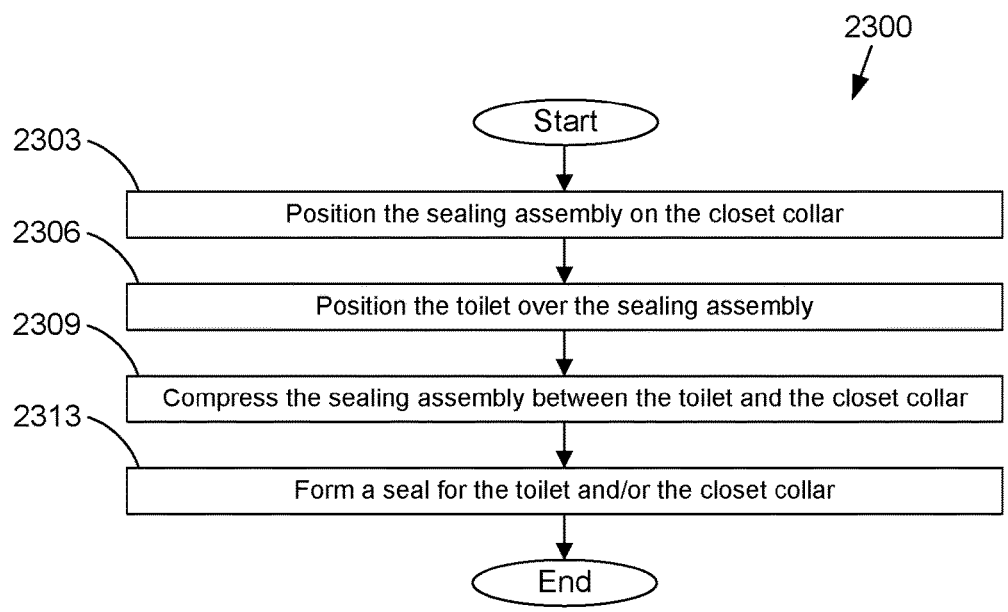

FIG. 23 is a flowchart representing an example of a portion of the functionality performed in association with a sealing assembly according to various embodiments of the present disclosure.

DETAILED DESCRIPTION

With reference to FIG. 1A, shown is a cross-section of an example of a closet collar 100 upon which a toilet may be installed. The closet collar 100 is shown relative to a finished floor 103. The closet collar 100 provides a passage between the toilet and a drain pipe 106. As such, waste can travel from the toilet, through the closet collar 100, through the drain pipe 106, and to a sewage system (not shown).

The closet collar 100 comprises a closet collar flange 109 that serves as a connection point between the closet collar 100 and the toilet. In this regard, toilet bolts may attach the toilet to the closet collar flange 109 of the closet collar 100. In the embodiment shown in FIG. 1A, the closet collar 100 is positioned with respect to the finished floor 103 so that the closet collar flange 109 of the closet collar 100 is flush with the surface of the finished floor 103. Such a situation may occur, for example, when the closet collar 100 is installed on subflooring and then finished floor 103 is installed around the closet collar 100. For instance, ceramic tile or other types of finished floor 103 may be installed on subflooring, resulting in the closet collar flange 109 of the closet collar 100 being flush with the finished floor 103.

With reference to FIG. 1B, shown is a situation in which the closet collar 100 is installed so that the closet collar flange 109 is recessed in the finished floor 103. Such a situation may occur, for example, when the closet collar 100 is installed on subflooring and then relatively thick finished floor 103 is installed around the closet collar 100.

With reference to FIG. 1C, shown is another installation configuration of the closet collar 100. In the embodiment shown in FIG. 1C, the closet collar flange 109 of the closet collar 100 is above the finished floor 103. According to various embodiments of the present disclosure, various mechanisms are described that may be used with one or more of the installation situations for the closet collar 100 that are shown in FIGS. 1A-1C.

Figure 2A:
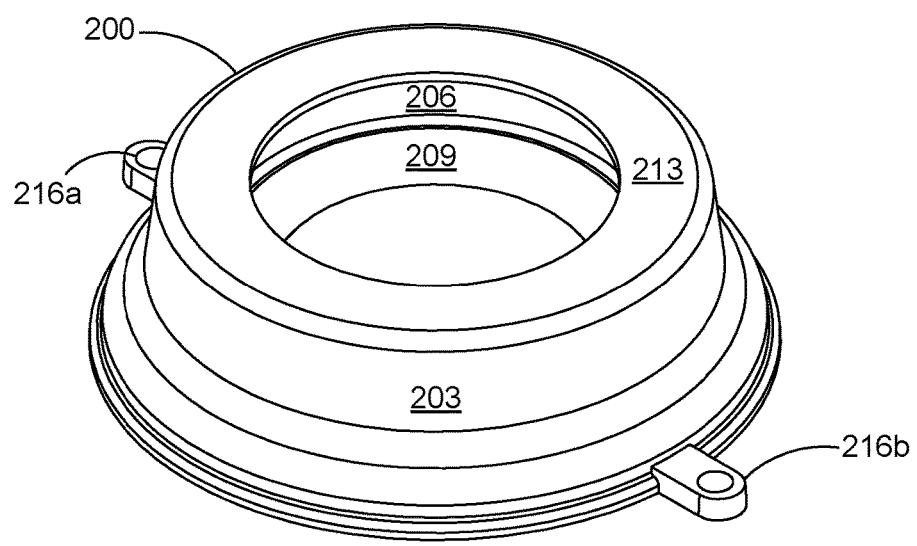
FIGS. 2A-2B are drawings of a first example of a sealing assembly for one or more of the closet collar installations of FIGS. 1A-1C according to various embodiments of the present disclosure.
Figure 2B:
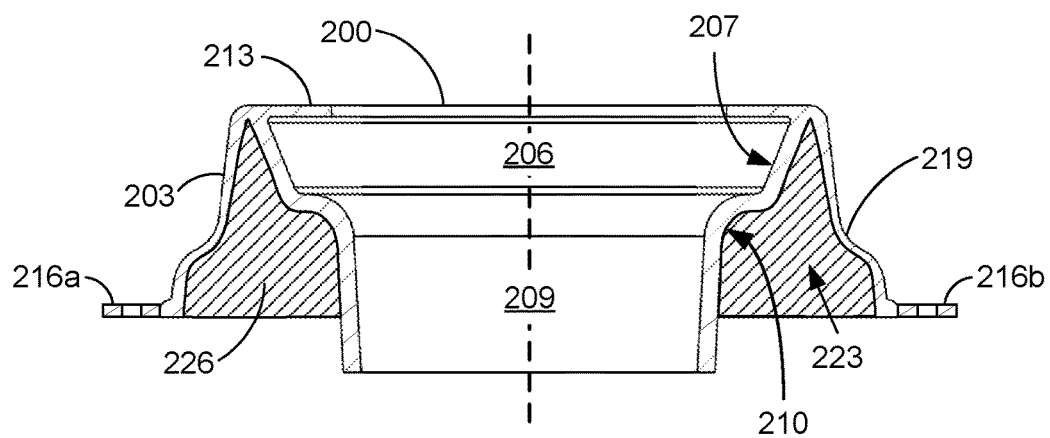

With reference to FIGS. 2A-2B, shown is an example of a sealing assembly 200 that can be used to provide a seal for a toilet and/or a closet collar 100. In particular, FIG. 2A shows a perspective view of the sealing assembly 200, and FIG. 2B shows a cross-section of the sealing assembly 200. The sealing assembly 200 in various embodiments may comprise a flexible membrane. For example, the sealing assembly 200 may be constructed of polyvinylchloride (PVC) rubber, thermoplastic elastomer (TPE), thermoplastic rubber (TPR), styrene-butadiene rubber (SBR), ethylene propylene diene monomer (EPDM) rubber, acrylonitrile butadiene styrene (ABS) plastic, polyoxymethylene (POM) plastic, neoprene, foam rubber, silicone, and/or any other suitable material. In various embodiments, the sealing assembly 200 may comprise one or more rigid components that provide structural support for regions of the sealing assembly 200. For instance, a flexible membrane may be formed over one or more rigid components, one or more rigid components may be formed over a flexible membrane, or a rigid component may be attached to a flexible membrane using any other suitable method.

The sealing assembly 200 is configured to facilitate the formation of one or more seals for the closet collar 100 and/or the toilet. In the embodiment shown in FIGS. 2A-2B, the sealing assembly 200 forms a channel wall 203, a toilet horn receptacle 206, a funnel 209, a sealing rim 213, and ears 216a-216b. The channel wall 203 in the embodiment shown in FIGS. 2A-2B circumscribes the toilet horn receptacle 206 and the funnel 209. Additionally, the channel wall 203 in the present embodiment may include a bend 219. The bend 219 may facilitate the sealing assembly 200 flexing in one or more locations. To facilitate such flexing, the portion of the sealing assembly 200 that forms the bend 219 may be relatively thin as compared to one or more other portions of the sealing assembly 200.

The toilet horn receptacle 206 is configured to receive the toilet horn that is located on the bottom of the toilet. The sealing rim can be positioned at a first end of the toilet horn receptacle wall 207 as illustrated in the example of FIG. 2A. The sealing rim 213 is a portion of the sealing assembly 200 that is configured to contact the toilet horn and to form a seal for the toilet. In various embodiments, the portion of the sealing assembly 200 that forms the toilet horn receptacle 206 may be more rigid than the portions of the sealing assembly 200 that form the channel wall 203 and/or the sealing rim 213. To this end, the thickness of the portion of the sealing assembly 200 that forms the toilet horn receptacle 206 may be relatively thick as compared to other portions of the sealing assembly 200. Additionally or alternatively, the portion of the sealing assembly 200 that forms the toilet horn receptacle 206 may be made relatively rigid by attaching a rigid component, such as a plastic hoop or other type of rigid element, to the toilet horn receptacle 206 or by embedding a rigid component in the sealing assembly 200. It is noted that in various embodiments, the sealing rim 213 may be omitted, and/or a sealing compound may be used to facilitate the formation of a seal for the sealing assembly 200 and the toilet.

The funnel 209 is a portion of the sealing assembly 200 that is configured to be inserted into the passageway of the closet collar 100. The funnel 209 can comprise a transition 210 between a second end of the toilet horn receptacle wall 207 and a lower portion of the funnel 209. As shown in the example of FIG. 2A, the transition can extend inward from the second end of the toilet horn receptacle wall 207 towards a center axis (dashed line). Additionally, the funnel 209 forms a passageway through which waste from the toilet can flow to the drain pipe 106. According to various embodiments, the portion of the sealing assembly 200 that forms the funnel 209 may be more rigid than the portions of the sealing assembly 200 that form the channel wall 203 and/or the sealing rim 213. To this end, the thickness of the portion of the sealing assembly 200 that forms the funnel 209 may be greater than the thickness of the portions of the sealing assembly 200 that form the channel wall 203 and/or the sealing rim 213. Additionally or alternatively, the portion of the sealing assembly 200 that forms the funnel 209 may be made more rigid than other portions of the sealing assembly 200 by attaching a rigid component to the funnel 209 or by embedding a rigid component in the sealing assembly 200.

The ears 216a-126b may be attached to the channel wall 203 and may facilitate attaching the end of the channel wall 203 to the closet collar 100. To this end, the ears 216a-216b may include openings through which respective toilet bolts can be inserted.

In the embodiment shown in FIGS. 2A-2B, the channel wall 203, the toilet horn receptacle 206, and the funnel 209 form a channel 223. The portion of the sealing assembly 200 that forms the channel 223 may be flexible or rigid. In the embodiment shown in FIGS. 2A-2B, the channel 223 is a continuous annular receptacle.

According to various embodiments, one or more sealing components 226 may be disposed in the channel 223. As non-limiting examples, petrolatum, wax, foam, rubber, a sealed bladder, and/or any other suitable material can be disposed in the channel 223, which can adhere to at least one surface of the channel 233. In the embodiment shown in FIGS. 2A-2B, a petrolatum has been disposed in the channel 223.

Figure 3A:
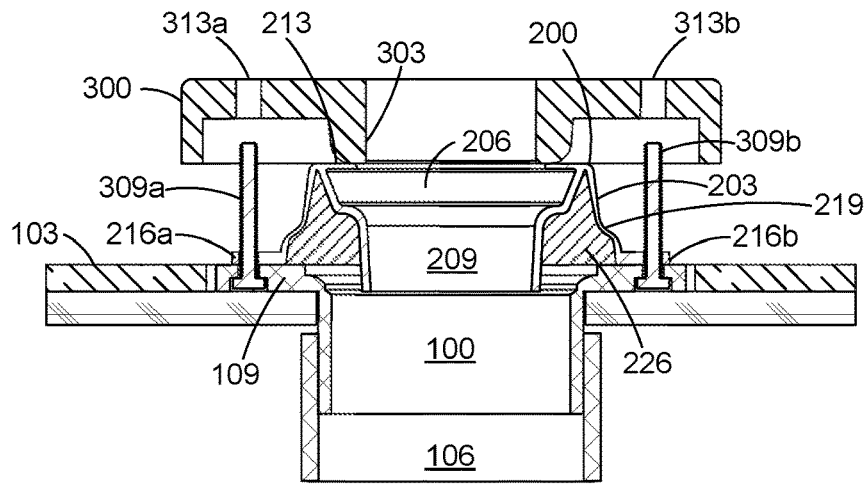
FIGS. 3A-3C are drawings depicting an installation of the sealing assembly of FIGS. 2A-2B according to various embodiments of the present disclosure.
Figure 3B:
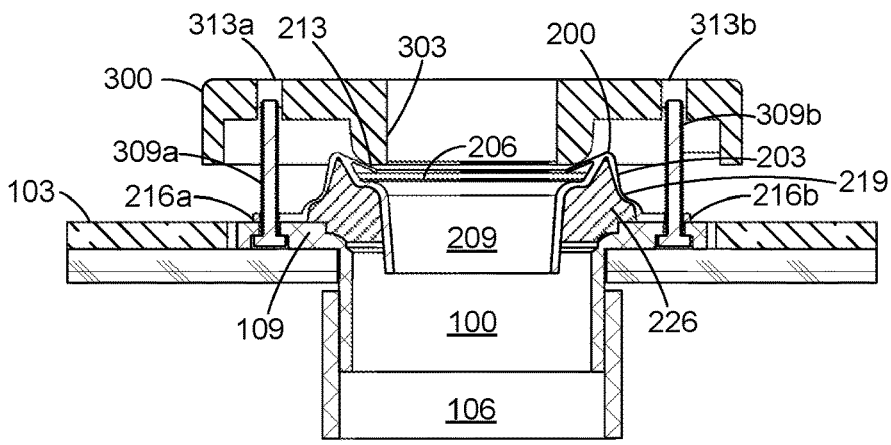
Figure 3C:
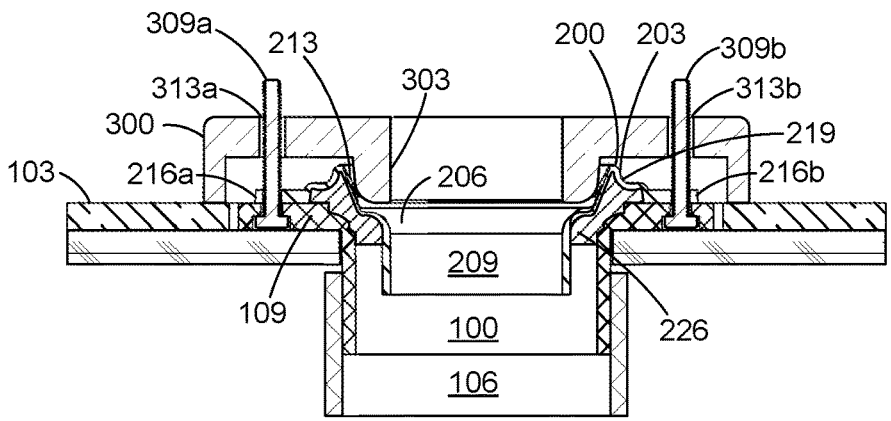

With reference to FIGS. 3A-3C, shown are cross-section views depicting a progression of a toilet 300 being installed over the closet collar 100 using the sealing assembly 200 that is shown in FIGS. 2A-2B. Beginning with FIG. 3A, shown is a first drawing depicting the progression of the toilet 300 being installed over the closet collar 100. FIG. 3A shows the sealing assembly 200 in relation to the closet collar 100, the finished floor 103, the drain pipe 106, and a portion of the toilet 300.

As shown, the sealing assembly 200 has been positioned over the closet collar 100. It is noted that the sealing component 226 contained in the channel 223 of the sealing assembly 200 has not yet been deformed or extruded from the channel 223. In this regard, the sealing component 226 has the same shape and form as the sealing component 226 shown in FIG. 2B.

The toilet bolts 309a-309b that extend through the closet collar flange 109 of the closet collar 100 have been inserted through the corresponding ears 216a-216b. Inserting the toilet bolts 309a-309b through the corresponding ears 216a-216b may facilitate the proper alignment of the sealing assembly 200 with respect to the closet collar 100.

As shown, the toilet 300 is positioned over the sealing assembly 200 so that the toilet horn 303 is aligned with the toilet horn receptacle 206. Additionally, toilet bolt receptacles 313a-313b in the toilet 300 are aligned with the corresponding toilet bolts 309a-309b.

With reference to FIG. 3B, shown is a second drawing representing the progression of the toilet 300 being installed over the closet collar 100. As compared to FIG. 3A, the toilet 300 has been lowered towards the finished floor 103. As a result, the sealing rim 213 has been flexed around the toilet horn 303 and forced towards the closet collar 100. In turn, the toilet horn receptacle 206 has been forced towards the closet collar 100, and the funnel 209 has been forced further into the closet collar 100 towards the drain pipe 106.

The toilet bolts 309a-309b may be inserted into the ears 216a-216b so that the end of the channel wall 203 that is near the ears 216a-216b may maintain contact with the closet collar flange 109 of the closet collar 100. Additionally, because the funnel 209 and the toilet horn receptacle 206 have been forced towards the drain pipe 106, the channel wall 203 may be flexed about the bend 219 and/or at other locations.

Thus, the sealing assembly 200 has been compressed between the toilet 300 and the closet collar 100. As a result, a portion of the sealing component 226 has been extruded by the sealing assembly 200 into the region between the funnel 209 and the closet collar 100 as shown.

With reference to FIG. 3C, shown is a third drawing depicting the progression of the toilet 300 being installed using the sealing assembly 200. As compared to FIG. 3B, the toilet 300 has been lowered so that it contacts the finished floor 103. Additionally, the toilet horn receptacle 206 has forced the sealing rim 213 and the toilet horn receptacle 206 further towards the drain pipe 106. As a result, the sealing rim 213 has made a seal with respect to the toilet 300. Thus, liquids and/or gases may be prevented from passing between the sealing assembly 200 and the toilet 300.

Because the toilet horn receptacle 206 has been forced further towards the drain pipe 106, the funnel 209 has also been forced further into the closet collar 100 towards the drain pipe 106. Since the funnel 209 and the toilet horn receptacle 206 have been forced further towards the drain pipe 106, the channel wall 203 has been flexed further about the bend 219 and/or at other locations.

Thus, the sealing assembly 200 has been further compressed between the toilet 300 and the closet collar 100. As a result, more of the sealing component 226 has been extruded from the sealing assembly 200 to the region between the funnel 209 and the closet collar 100, as compared to that shown in FIG. 3B. Thus, liquids and/or gasses may be prevented from passing between the sealing assembly 200 and the closet collar 100.

Figure 4:
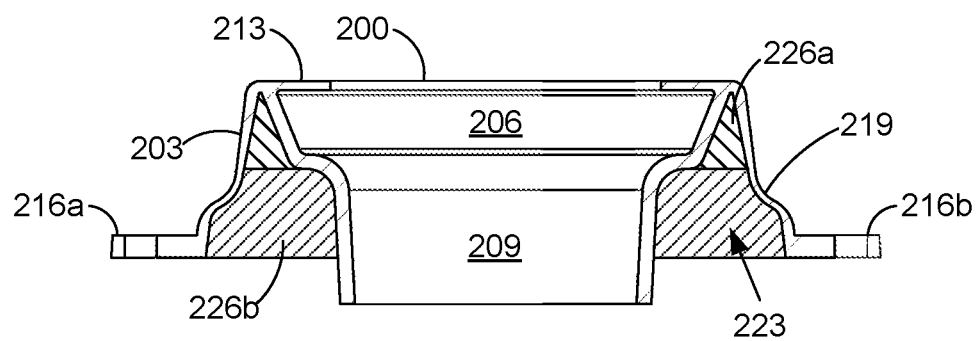
FIG. 4 is a drawing of a second example of a sealing assembly for one or more of the closet collar installations of FIGS. 1A-1C according to various embodiments of the present disclosure.

With reference now to FIG. 4, shown is a cross section of another example of the sealing assembly 200 according to various embodiments of the present disclosure. In the embodiment shown in FIG. 4, the sealing assembly 200 comprises multiple sealing components 226, referred to herein as the first sealing component 226a and the second sealing component 226b. The first sealing component 226a is located in the channel 223 between the sections of the sealing assembly 200 that form the toilet horn receptacle 206 and the channel wall 203, and the second sealing component 226b is located in the channel 223 between the sections of the sealing assembly 200 that form the funnel 209 and the channel wall 203. The second sealing component 226b may comprise, for example, petrolatum, wax, foam, rubber, a sealed bladder, and/or any other suitable material that can form a seal for the closet collar 100. The first sealing component 226a may comprise a material that provides more resistance to compression as compared to the second sealing component 226b. To this end, the first sealing component 226a may comprise for example, petrolatum, wax, foam, rubber, a sealed bladder, and/or any other suitable material that provides more resistance to compression than the second sealing component 226b. As a result of its relative resistance to compression, the first sealing component 226a may provide structural support for the toilet horn receptacle 206.

Figure 5:
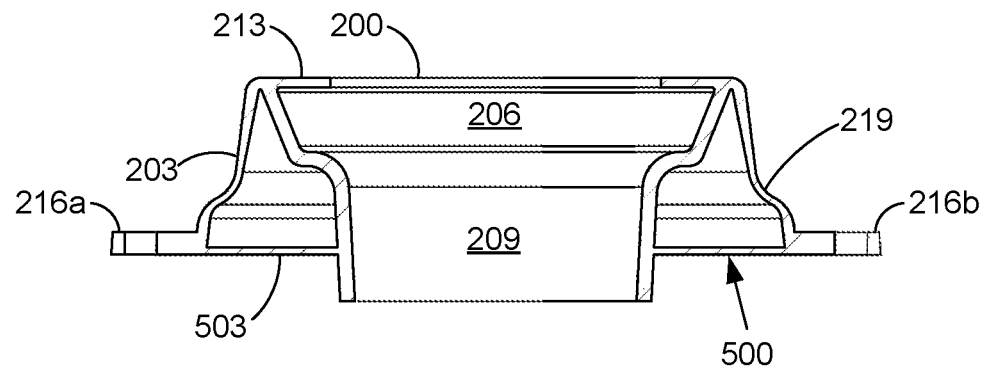
FIG. 5 is a drawing of a third example of a sealing assembly for one or more of the closet collar installations of FIGS. 1A-1C according to various embodiments of the present disclosure.

With reference to FIG. 5, shown is a cross section of another example of the sealing assembly 200 according to various embodiments of the present disclosure. In the embodiment shown in FIG. 5, the sealing component 226 comprises a sealed bladder 500. The sealed bladder 500 is configured to be compressed between the toilet 300 and the closet collar 100 to form a seal for the closet collar 100. To this end, the sealing assembly 200 in the embodiment shown in FIG. 5 comprises a sealing wall 503 that extends from the funnel 209 to the channel wall 203 as shown. To facilitate the sealing wall 503 being flexible, the sealing wall 503 may be relatively thin relative to the portions of the sealing assembly 200 that form the funnel 209 and/or the toilet horn receptacle 206.

The sealed bladder 500 may contain various substances according to various embodiments. For example, the sealed bladder 500 may contain air, water, petrolatum, wax, gel, and/or any other suitable substance. Additionally, in various embodiments, the substance contained within the sealed bladder 500 can be a sealant that is configured to seal the sealed bladder 500 if the sealed bladder 500 ruptures.

When the sealing assembly 200 in the embodiment of FIG. 5 is compressed between the toilet 300 and the closet collar 100, the sealed bladder 500 is compressed. As a result, the sealing wall 503 may be forced into a region between the closet collar 100 and the sealing assembly 200. In turn, the sealing wall 503 may form a seal between the funnel 209 and the closet collar 100. Thus, liquids and/or gases may be prevented from passing between the sealing assembly 200 and the closet collar 100.

Figure 6:
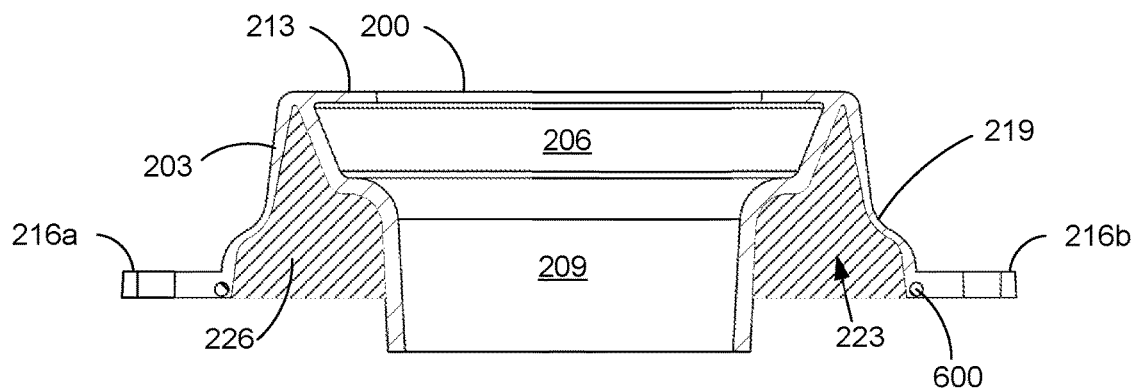
FIG. 6 is a drawing of a fourth example of a sealing assembly for one or more of the closet collar installations of FIGS. 1A-1C according to various embodiments of the present disclosure.

With reference to FIG. 6, shown is a cross section of another example of a sealing assembly 200 according to various embodiments. The sealing assembly 200 shown in FIG. 6 is similar to the sealing assembly 200 that is shown in FIGS. 2A-2B. However, the sealing assembly 200 shown in FIG. 6 further comprises a hoop 600. The hoop 600 in the embodiment shown in FIG. 6 is embedded in the channel wall 203. In alternative embodiments, the hoop 600 may be, for example, attached to the exterior or interior side of the channel wall 203.

The hoop 600 may provide structural support for the end of the channel wall 203 that forms the outer edge of the channel wall 203. The hoop 600 may also facilitate forming and maintaining a seal for the closet collar 100. In this regard, the hoop 600 may restrict the end of the channel wall 203 from deforming when the sealing assembly 200 is compressed between the toilet 300 and the closet collar flange 109. Thus, the hoop may facilitate maintaining the end of the channel wall 203 against the closet collar flange 109. In turn, this may prevent the sealing component 226 from being forced out between the sealing assembly 200 and the closet collar flange 109. As a result, the sealing component 226 may be forced down between the funnel 209 and the closet collar 100.

Figure 7:
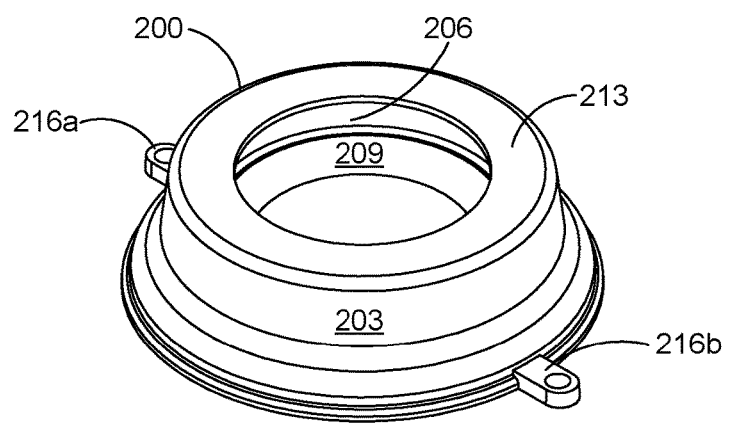
FIG. 7 is a drawing of a cover for a sealing assembly according to various embodiments of the present disclosure.
Figure 7:
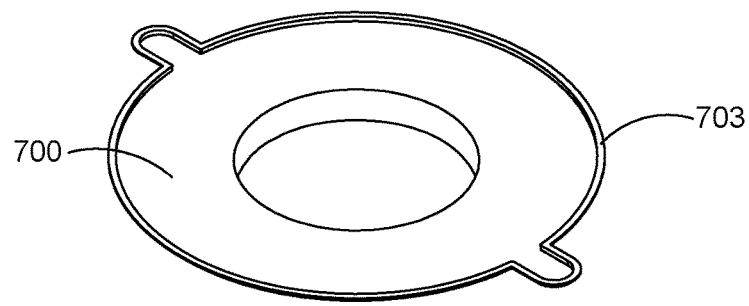

With reference to FIG. 7, shown is a perspective view of an example of the sealing assembly 200 shown in FIGS. 2A-2B and a cover 700 according to various embodiments of the present disclosure. The cover 700 is configured to attach to the sealing assembly 200. To this end, the cover 700 in the embodiment shown in FIG. 7 includes a lip 703 that may fit over the sides of the ears 216a-216b and the channel wall 203 of the sealing assembly 200. The cover 700 may prevent the sealing component 226 from becoming separated from the sealing assembly 200 during, for example, shipping or storage of the sealing assembly 200. For instance, if the sealing component 226 is petrolatum, the cover 700 may prevent the petrolatum from flowing out of the sealing assembly 200 if the petrolatum melts. According to various embodiments, the cover 700 may comprise, for example, paper, plastic, metal, or any other suitable material.

Figure 8:
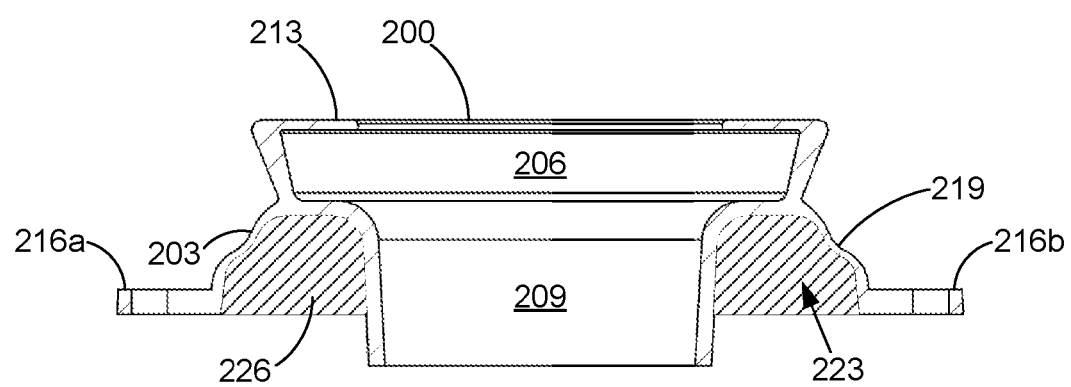
FIG. 8 is a drawing of a fifth example of a sealing assembly for one or more of the closet collar installations of FIGS. 1A-1C according to various embodiments of the present disclosure.

With reference to FIG. 8, shown is a cross section of another example of a sealing assembly 200 according to various embodiments of the present disclosure. The sealing assembly 200 shown in FIG. 8 is similar to the sealing assembly 200 shown in FIGS. 2A-2B. For example, the sealing assembly 200 forms a channel 223 in which a sealing component 226, such as petrolatum or any other type of sealing substance, can be disposed. However, the channel 223 in FIG. 8 is positioned between the funnel 209 and the channel wall 203. To this end, the channel wall 203 extends from the bottom of the toilet horn receptacle 206, and the channel wall 203 circumscribes the funnel 209.

Figure 9:
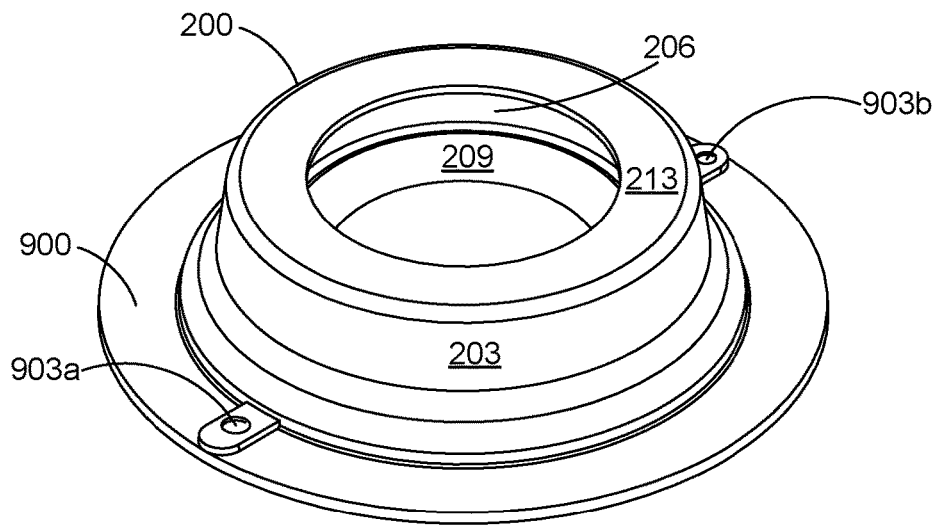
FIG. 9 is a drawing of a sixth example of a sealing assembly for one or more of the closet collar installations of FIGS. 1A-1C according to various embodiments of the present disclosure.

With reference to FIG. 9, shown is a perspective view of another sealing assembly 200 according to various embodiments of the present disclosure. The sealing assembly 200 shown in FIG. 9 is similar to the sealing assembly 200 shown in FIGS. 2A-2B. However, the sealing assembly 200 shown in FIG. 9 includes a sealing assembly flange 900 instead of the ears 216a-216b. The sealing assembly flange 900 is, for example, a portion of the sealing assembly 200 that is attached to and circumscribes the end of the channel wall 203. In some embodiments, the sealing assembly flange 900 may comprise a rigid material and may be removably or permanently affixed to the sealing assembly 200. The sealing assembly flange 900 may also include one or more bolt holes 903a-903b or slots through which the toilet bolts 309a-309b may insert.

The sealing assembly flange 900 may provide structural support for the end of the channel wall 203 that is near the sealing assembly flange 900. The sealing assembly flange 900 may also facilitate forming and maintaining a seal for the closet collar 100. In this regard, the sealing assembly flange 900 may restrict the end of the channel wall 203 from deforming when the sealing assembly 200 is compressed between the toilet 300 and the closet collar flange 109. Thus, the sealing assembly flange 900 may facilitate maintaining the end of the channel wall 203 against the closet collar flange 109. In turn, this may prevent the sealing component 226 from being forced out between the sealing assembly 200 and the closet collar flange 109. As a result, the sealing component 226 may be forced down between the funnel 209 and the closet collar 100.

Figure 10:
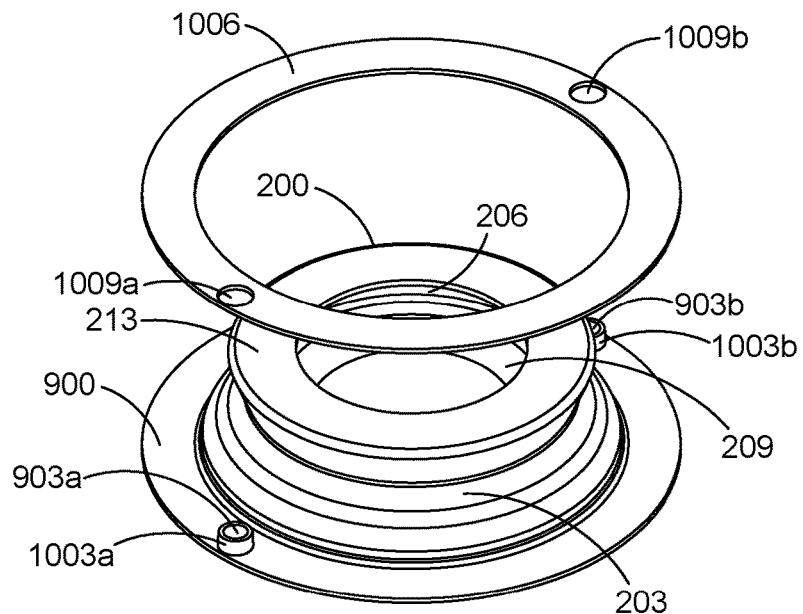
FIG. 10 is a drawing of a seventh example of a sealing assembly for one or more of the closet collar installations of FIGS. 1A-1C according to various embodiments of the present disclosure.

With reference to FIG. 10, shown is a perspective view of another example of the sealing assembly 200 according to various embodiments of the present disclosure. The sealing assembly 200 in the embodiment shown in FIG. 10 is similar to the sealing assembly 200 in the embodiment shown in FIG. 9. However, the sealing assembly 200 in the embodiment shown in FIG. 10 further comprises protrusions 1003a-1003b that extend from the surface of the sealing assembly flange 900.

As shown in FIG. 10, a ring 1006 is associated with the sealing assembly 200. According to various embodiments, the ring 1006 may be rigid. To this end, the ring 1006 may comprise, for example, plastic, metal, and/or any other suitable material. In some embodiments, the ring 1006 may be attached to the sealing assembly 200 by a friction fit. The ring 1006 is configured to be positioned on the sealing assembly flange 900 and to attach the sealing assembly flange 900 to the closet collar flange 109. As such, the ring 1006 in the embodiment shown in FIG. 10 includes ring holes 1009a-1009b through which the protrusions 1003a-1003b may be inserted. When the protrusions 1003a-1003b are inserted into the respective ring holes 1009a-1009b, the ring 1006 may be positioned flat against the sealing assembly flange 900. Additionally, the toilet bolts 309a-309b may be inserted into the ring holes 1009a-1009b. In alternative embodiments, the ring 1006 may be embedded within the sealing assembly 200, the ring 1006 may be molded over the sealing assembly 200, or the ring 1006 may be attached to the sealing assembly 200 using any other suitable method.

When the toilet 300 is installed over the sealing assembly 200 and the ring 1006, the ring 1006 in conjunction with the sealing assembly flange 900 may restrict the end of the channel wall 203 from deforming when the sealing assembly 200 is compressed between the toilet 300 and the closet collar 100. Thus, the ring 1006 in conjunction with the sealing assembly flange 900 may facilitate maintaining the end of the channel wall 203 against the closet collar flange 109. In turn, this may prevent the sealing component 226 from being forced out between the sealing assembly 200 and the closet collar flange 109. As a result, the sealing component 226 may be forced down between the funnel 209 and the closet collar 100.

Figure 11A:
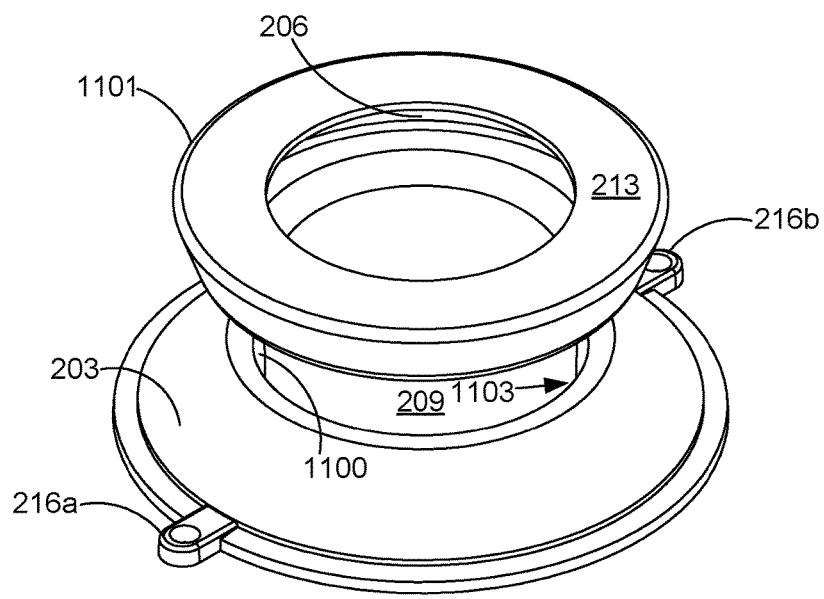
FIGS. 11A-11B are drawings of an eighth example of a sealing assembly for one or more of the closet collar installations of FIGS. 1A-1C according to various embodiments of the present disclosure.
Figure 11B:
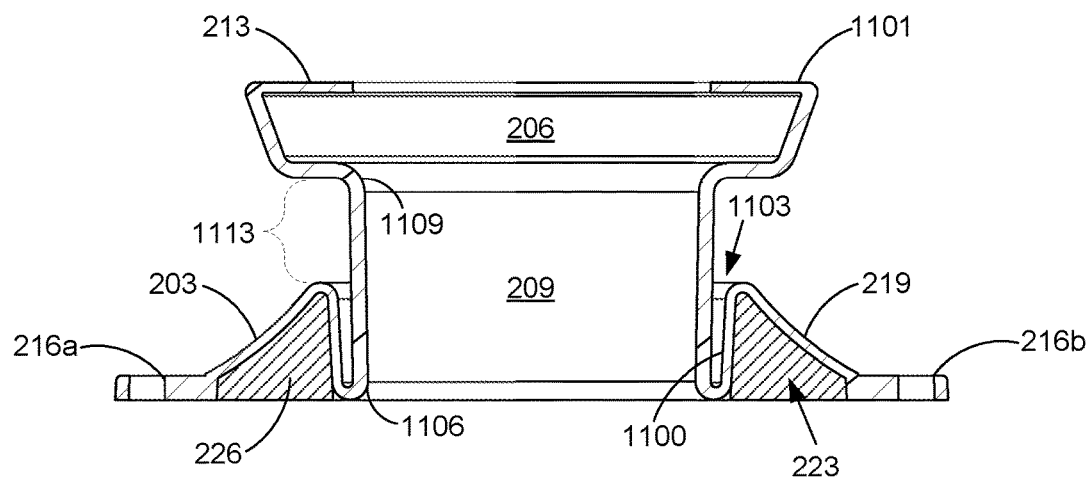

With reference to FIGS. 11A-11B, shown is another example of a sealing assembly 200, referred to herein as the sealing assembly 1101, according to various embodiments of the present disclosure. In particular, FIG. 11A shows a perspective view of the sealing assembly 1101, and FIG. 11B shows a cross section of the sealing assembly 1101. The sealing assembly 1101 may be constructed out of, for example, a flexible membrane. In various embodiments, one or more rigid components may be attached to the flexible membrane to provide structural support for the various features of the sealing assembly 1101.

The sealing assembly 1101 in the embodiment shown in FIGS. 11A-11B includes the channel wall 203, the toilet horn receptacle 206, the funnel 209, the sealing rim 213, the bend 219, and the ears 216a-216b. Additionally, the sealing assembly 1101 comprises a recess wall 1100 that forms the channel 223 in conjunction with the channel wall 203. Additionally, the recess wall 1100 and the funnel 209 form a recess 1103 when the sealing assembly 1101 is in the position shown in FIGS. 11A-11B.

In alternative embodiments, the sealing assembly 1101 may comprise or be associated with various types of components and/or features. For example, the sealing assembly 1101 may comprise or be associated with a sealing assembly flange 900, multiple sealing components 226a-226b, a hoop 600, a sealed bladder 500, a cover 700, a ring 1006, and/or another type of component and/or feature.

When the sealing assembly 1101 is in the configuration shown in FIGS. 11A-11B, a first end 1106 of the funnel 209 may align vertically with the ears 216a-216b as shown. Additionally, the second end 1109 of the funnel 209 is positioned such that there is a distance 1113 between the second end 1109 and the channel wall 203. Thus, when the sealing assembly 1101 that is shown in FIGS. 11A-11B is positioned on the closet collar 100 prior to the toilet 300 being installed, the funnel 209 extends above the top part of the channel wall 203, and the toilet horn receptacle 206 is positioned over the funnel 209 and the channel wall 203.

Figure 12A:
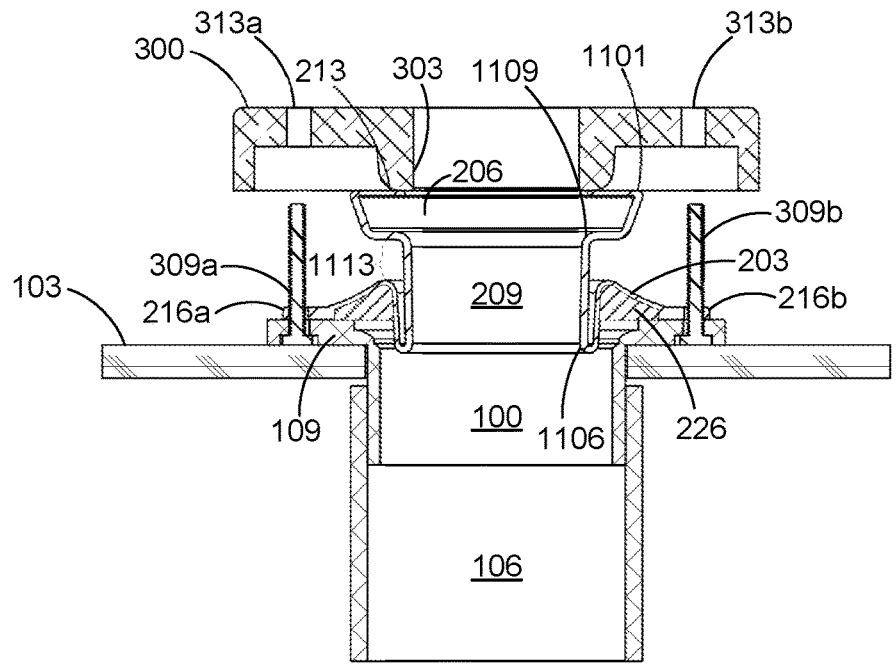
FIGS. 12A-12B are drawings depicting an installation of the sealing assembly of FIGS. 11A-11B according to various embodiments of the present disclosure.
Figure 12B:
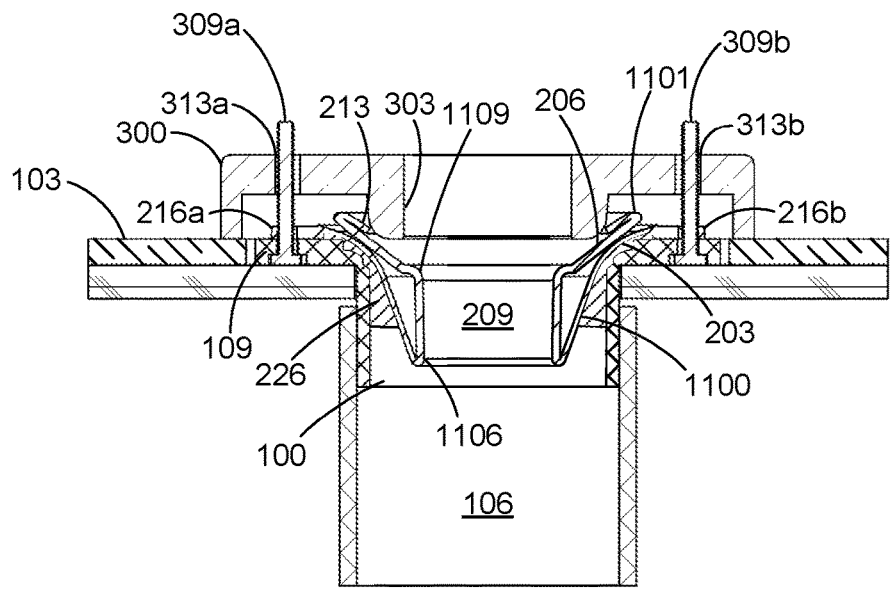

With reference to FIGS. 12A-12B, shown are cross-section views of a progression of a toilet 300 being installed over the closet collar 100 using the sealing assembly 1101 that is shown in FIGS. 11A-11B. Beginning with FIG. 12A, shown is a first drawing depicting the progression of the toilet 300 being installed over the closet collar 100. FIG. 12A shows the sealing assembly 1101 in relation to the closet collar 100, the finished floor 103, the drain pipe 106, and a portion of the toilet 300.

As shown, the sealing assembly 1101 has been positioned over the closet collar 100. It is noted that the sealing component 226 contained in the channel 223 of the sealing assembly 1101 has not yet been deformed or extruded from the channel 223. In this regard, the sealing component 226 has the same shape and form as the sealing component 226 shown in FIG. 11B.

The toilet bolts 309a-309b that extend through the closet collar flange 109 of the closet collar 100 have been inserted through the corresponding ears 216a-216b. Inserting the toilet bolts 309a-309b through the corresponding ears 216a-216b facilitates the proper alignment of the sealing assembly 1101 with respect to the closet collar 100. Thus, the toilet 300 is positioned over the sealing assembly 1101 so that the toilet horn 303 is aligned with the toilet horn receptacle 206. Additionally, the toilet bolt receptacles 313a-313b in the toilet 300 are aligned with the corresponding toilet bolts 309a-309b.

With reference to FIG. 12B, shown is a second drawing depicting the progression of the toilet 300 being installed using the sealing assembly 1101. As compared to FIG. 12A, the toilet 300 has been lowered so that it contacts the finished floor 103. Additionally, the sealing rim 213 and the toilet horn receptacle 206 have been forced towards the closet collar 100. In turn, the funnel 209 has also been forced further into the closet collar 100 towards the drain pipe 106. As a result, the channel wall 203 and the recess wall 1100 have been extended into the closet collar 100 towards the drain pipe 106. Because the channel wall 203 has been forced into the closet collar 100, the sealing component 226 is extruded from the channel 223 to the region located between the closet collar 100 and the sealing assembly 1101. It is noted that the second end 1109 of the funnel 209 is below the closet collar flange 109.

Thus, the sealing assembly 1101 has been compressed between the toilet 300 and the closet collar 100. As a result, the sealing component 226 has been extruded and forced downward from the sealing assembly 1101 to the region between the sealing assembly 1101 and the closet collar 100. Thus, liquids and/or gasses may be prevented from passing between the sealing assembly 1101 and the closet collar 100.

Figure 13A:
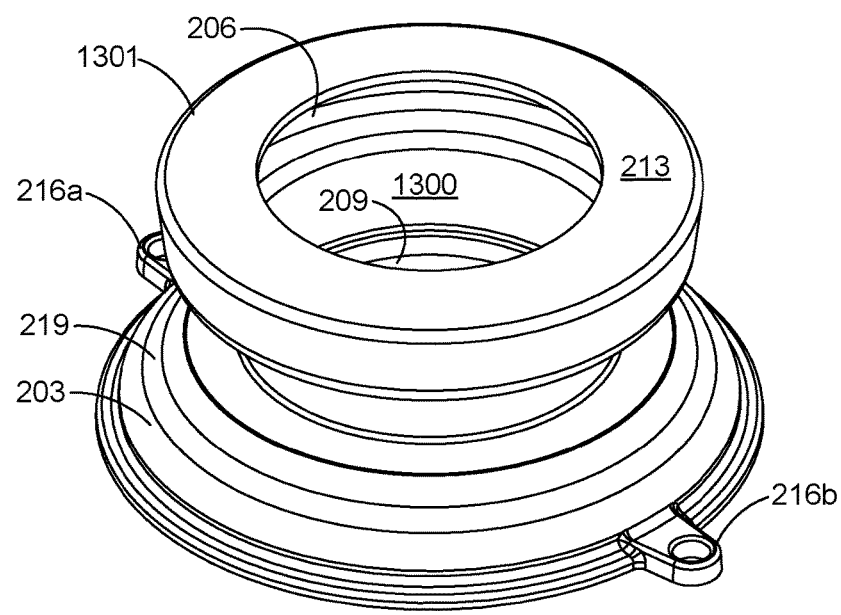
FIGS. 13A-13B are drawings of a ninth example of a sealing assembly for one or more of the closet collar installations of FIGS. 1A-1C according to various embodiments of the present disclosure.
Figure 13B:
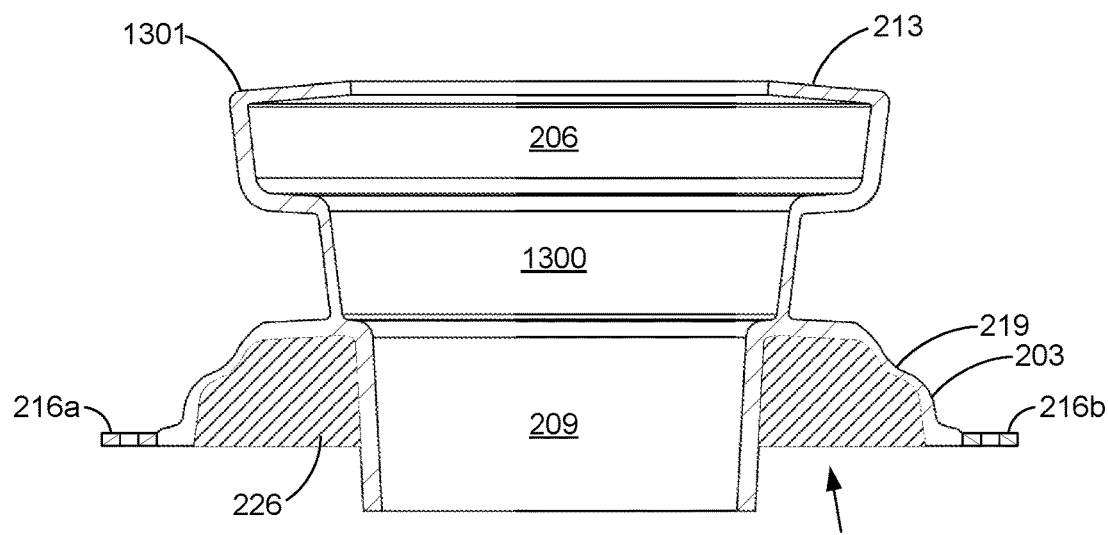

With reference to FIGS. 13A-13B, shown is another example of a sealing assembly 200, referred to herein as the sealing assembly 1301, according to various embodiments of the present disclosure. In particular, FIG. 13A shows a perspective view of the sealing assembly 1301, and FIG. 13B shows a cross section of the sealing assembly 1301. The sealing assembly 1301 may be constructed out of, for example, a flexible membrane. In various embodiments, one or more rigid components may be attached to the flexible membrane to provide structural support for the various features of the sealing assembly 1301.

The sealing assembly 1301 that is shown in FIGS. 13A-13B is similar to the sealing assembly 200 that is shown in FIG. 8. For example, the sealing assembly 1301 in the embodiment shown in FIGS. 13A-13B includes the channel wall 203, the toilet horn receptacle 206, the funnel 209, the sealing rim 213, the bend 219, and the ears 216a-216b. In addition, the sealing assembly 1301 forms a pipe extension 1300. The pipe extension 1300 in the embodiment shown in FIGS. 13A-13B is located between the funnel 209 and the toilet horn receptacle 206. The funnel 209 and the pipe extension 1300 have different diameters as shown in FIGS. 13A-13B. In alternative embodiments, the funnel 209 and the pipe extension 1300 may have the same diameter. In the embodiment shown, the channel wall 203 extends from the location where the funnel 209 and the pipe extension 1300 meet, and the channel wall 203 circumscribes the funnel 209.

The pipe extension 1300 may be relatively rigid as compared to other portions of the sealing assembly 1301. To this end, the thickness of the sealing assembly 1301 that forms the pipe extension 1300 may be greater than other portions of the sealing assembly 1301. Additionally or alternatively, a rigid hoop, plastic pipe section, or other type of component may be embedded within the portion of the sealing assembly 1301 that forms the pipe extension 1300 to make the pipe extension 1300 relatively rigid. In alternative embodiments, a rigid hoop or other type of component may be attached to the interior or exterior surface of the portion of the sealing assembly 1301 that forms the pipe extension 1300.

In alternative embodiments, the sealing assembly 1301 may comprise or be associated with various types of components and/or features. For example, the sealing assembly 1101 may comprise or be associated with a sealing assembly flange 900, multiple sealing components 226a-226b, a hoop 600, a sealed bladder 500, a cover 700, a ring 1006, and/or another type of component and/or feature.

Figure 14A:
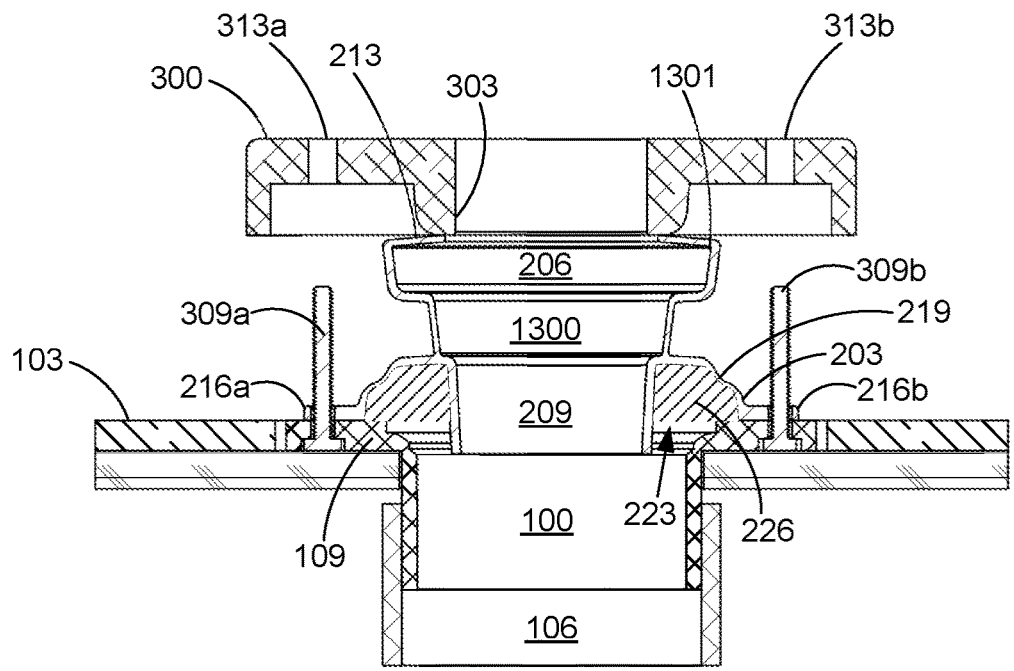
FIGS. 14A-14B are drawings depicting an installation of the sealing assembly of FIGS. 13A-13B according to various embodiments of the present disclosure.
Figure 14B:
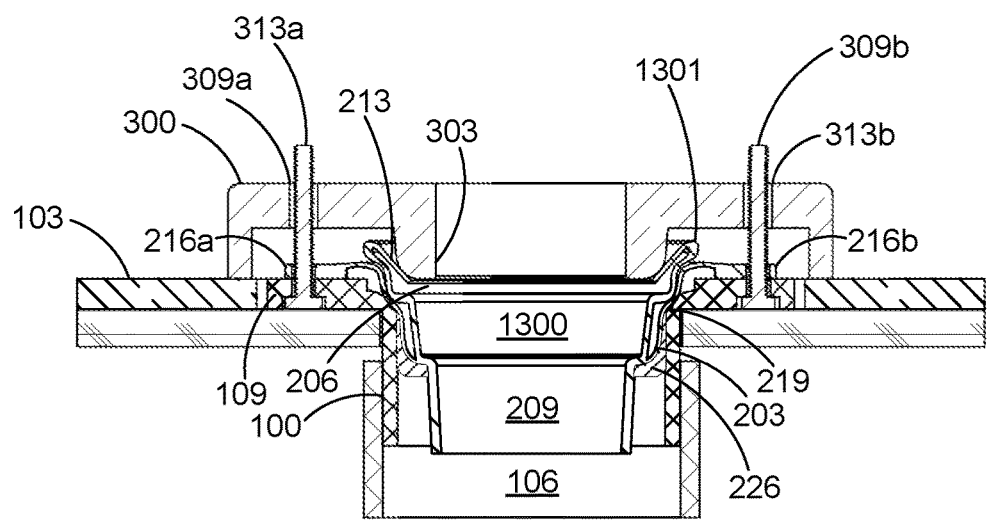

With reference to FIGS. 14A-14B, shown are cross-section views of a progression of a toilet 300 being installed over the closet collar 100 using the sealing assembly 1301 that is shown in FIGS. 13A-13B. Beginning with FIG. 14A, shown is a first drawing depicting the progression of the toilet 300 being installed over the closet collar 100. FIG. 14A shows the sealing assembly 1301 in relation to the closet collar 100, the finished floor 103, the drain pipe 106, and a portion of the toilet 300.

As shown, the sealing assembly 1301 has been positioned over the closet collar 100. It is noted that the sealing component 226 contained in the channel 223 of the sealing assembly 1301 has not yet been deformed or extruded from the channel 223. In this regard, the sealing component 226 has the same shape and form as the sealing component 226 shown in FIG. 13B.

When the sealing assembly 1301 is positioned on the closet collar 100 before the toilet 300 is installed, the pipe extension 1300 is positioned above the funnel 209 and the channel 223. Additionally, the toilet horn receptacle 206 is positioned above the pipe extension 1300 and the funnel 209. The toilet bolts 309a-309b that extend through the closet collar flange 109 have been inserted through the corresponding ears 216a-216b. Inserting the toilet bolts 309a-309b through the corresponding ears 216a-216b facilitates the proper alignment of the sealing assembly 1301 with respect to the closet collar 100. Thus, the toilet 300 is positioned over the sealing assembly 1301 so that the toilet horn 303 is aligned with the toilet horn receptacle 206. Additionally, the toilet bolt receptacles 313a-313b in the toilet 300 are aligned with the corresponding toilet bolts 309a-309b.

With reference to FIG. 14B, shown is a second drawing of the progression of the toilet 300 being installed using the sealing assembly 1301. As compared to FIG. 14A, the toilet 300 has been lowered so that it contacts the finished floor 103. Additionally, the toilet horn receptacle 206 has forced the sealing rim 213 and the toilet horn receptacle 206 further towards the drain pipe 106. As a result, the sealing rim 213 has made a seal with respect to the toilet 300. Thus, liquids and/or gases may be prevented from passing between the sealing assembly 1301 and the toilet 300.

Because the toilet horn receptacle 206 has been forced further towards the drain pipe 106, the funnel 209 has also been forced further into the closet collar 100 towards the drain pipe 106. Since the funnel 209 and the toilet horn receptacle 206 have been forced further towards the drain pipe 106, the channel wall 203 has flexed further about the bend 219 and/or at other locations. Thus, the sealing assembly 1301 has been further compressed between the toilet 300 and the closet collar 100. As a result, at least a portion of the sealing component 226 has been extruded from the sealing assembly 1301 to the region between the funnel 209 and the closet collar 100. Thus, liquids and/or gasses may be prevented from passing between the sealing assembly 1301 and the closet collar 100.

Figure 15A:
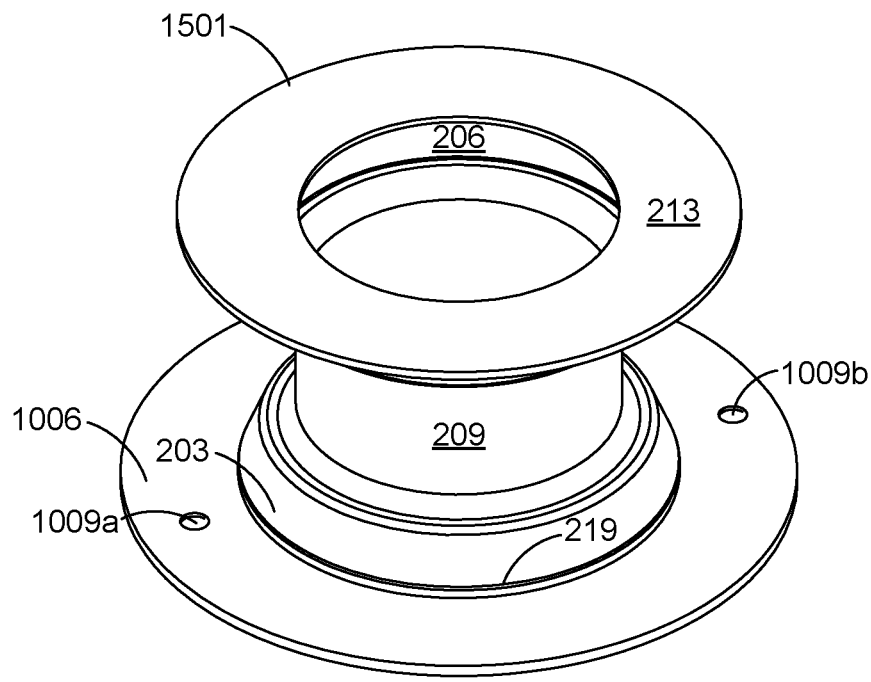
FIGS. 15A-15B are drawings of a tenth example of a sealing assembly for one or more of the closet collar installations of FIGS. 1A-1C according to various embodiments of the present disclosure.
Figure 15B:
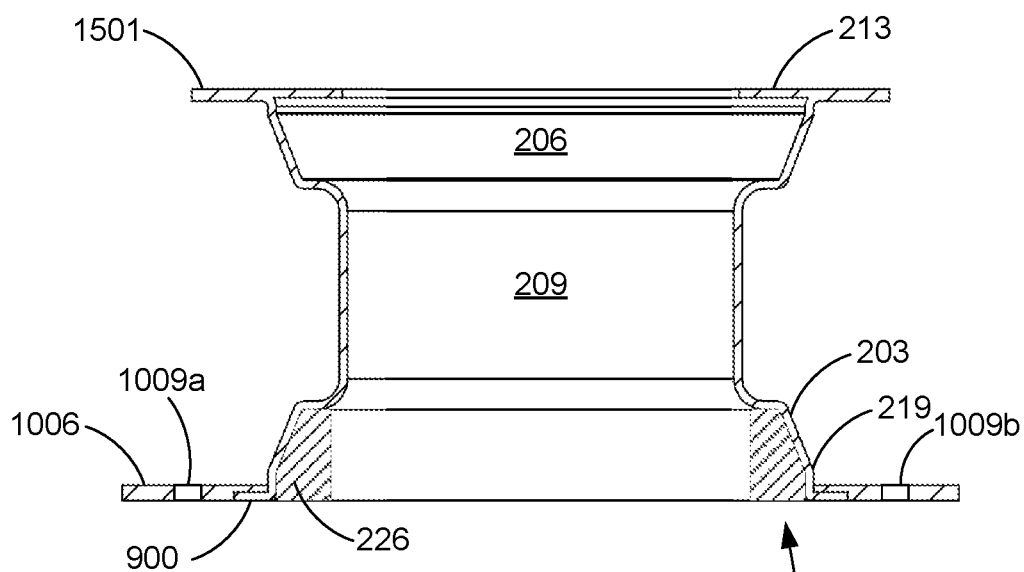

With reference to FIGS. 15A-15B, shown is another example of a sealing assembly 200, referred to as the sealing assembly 1501, according to various embodiments of the present disclosure. In particular, FIG. 15A shows a perspective view of the sealing assembly 1501, and FIG. 15B shows a cross section of the sealing assembly 1501. The sealing assembly 1501 may be constructed out of, for example, a flexible membrane. In various embodiments, one or more rigid components may be attached to the flexible membrane to provide structural support for the various features of the sealing assembly 1501.

The sealing assembly 1501 in the embodiment shown in FIGS. 15A-15B includes the channel wall 203, the toilet horn receptacle 206, the funnel 209, the sealing rim 213, the bend 219, and the sealing assembly flange 900. In the present embodiment, the entire funnel 209 is positioned between the channel 223 and the toilet horn receptacle 206 when the sealing assembly 1501 is not being compressed by the toilet 300.

Additionally, a ring 1006 is associated with the sealing assembly 1501. The ring 1006 may comprise the ring holes 1009a-1009b or slots that are configured to receive the toilet bolts 309a-309c. The ring 1006 is configured to be positioned over the sealing assembly flange 900 as shown.

In alternative embodiments, the sealing assembly 1501 may comprise or be associated with various types of components and/or features. For example, the sealing assembly 1101 may comprise or be associated with ears 216a-216b, multiple sealing components 226a-226b, a hoop 600, a sealed bladder 500, a cover 700, and/or another type of component and/or feature.

Figure 16A:
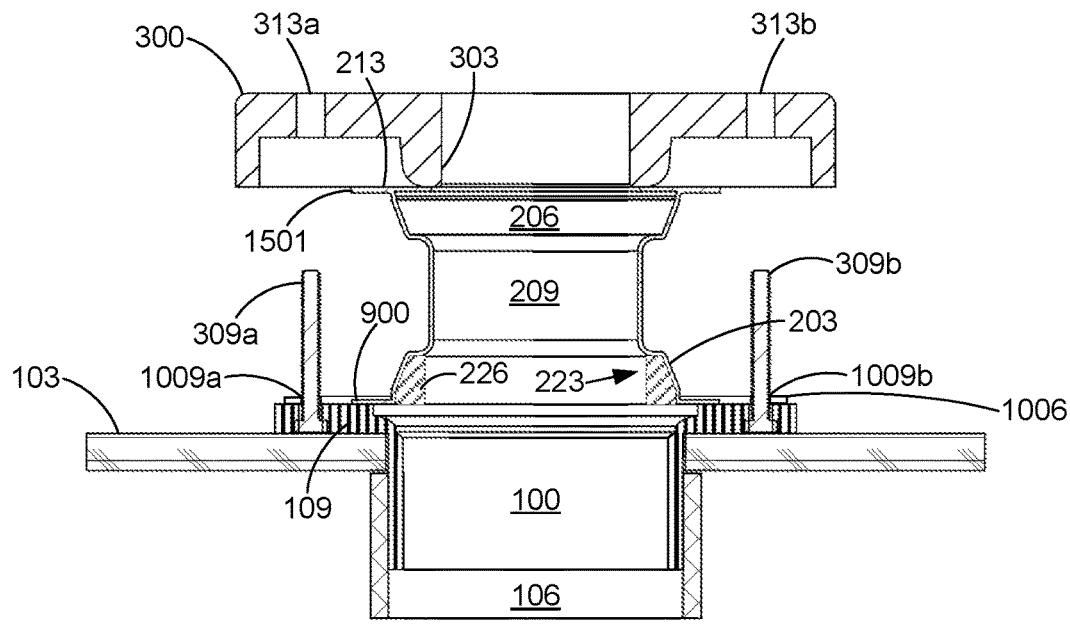
FIGS. 16A-16B are drawings depicting an installation of the sealing assembly of FIGS. 15A-15B according to various embodiments of the present disclosure.
Figure 16B:
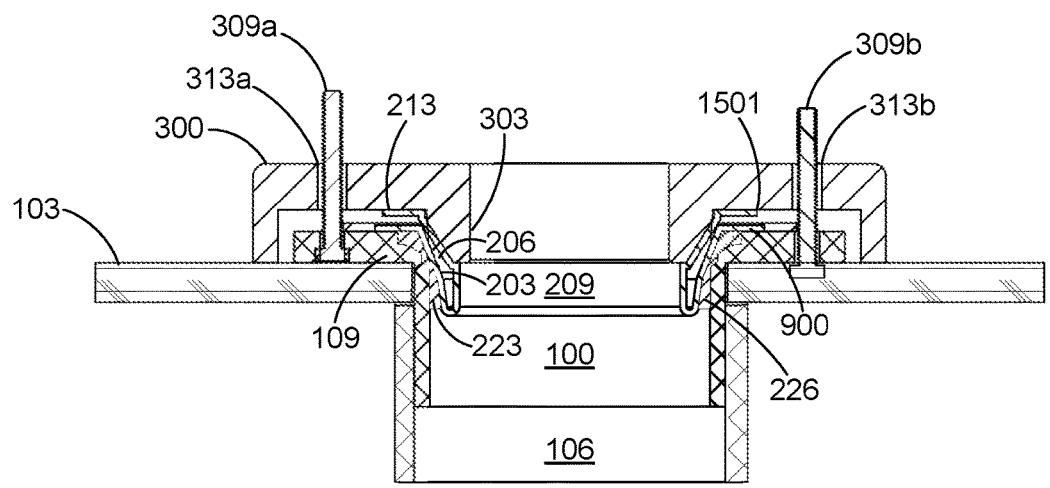

With reference to FIGS. 16A-16B, shown are cross-section views of a progression of a toilet 300 being installed over the closet collar 100 using the sealing assembly 1501 that is shown in FIGS. 15A-15B. Beginning with FIG. 16A, shown is a first drawing representing the progression of the toilet 300 being installed over the closet collar 100. FIG. 16A shows the sealing assembly 1501 in relation to the closet collar 100, the finished floor 103, the drain pipe 106, and a portion of the toilet 300.

As shown, the sealing assembly 1501 has been positioned over the closet collar 100. It is noted that the sealing component 226 contained in the channel 223 of the sealing assembly 1501 has not yet been deformed or extruded from the channel 223. In this regard, the sealing component 226 has the same shape and form as the sealing component 226 shown in FIG. 15B.

When the sealing assembly 1501 is positioned on the closet collar 100 before the toilet 300 has compressed the sealing assembly 1501, the entire funnel 209 is positioned between the channel 223 and the toilet horn receptacle 206. Additionally, the toilet bolts 309a-309b that extend through the closet collar flange 109 of the closet collar 100 have been inserted through the ring holes 1009a-1009b. Inserting the toilet bolts 309a-309b through the corresponding ring holes 1009a-1009b facilitates the proper alignment of the ring 1006 and the sealing assembly 1501 with respect to the closet collar 100. The toilet 300 is then positioned over the sealing assembly 1501 so that the toilet horn 303 is aligned with the toilet horn receptacle 206. Additionally, the toilet bolt receptacles 313a-313b in the toilet 300 are aligned with the corresponding toilet bolts 309a-309b.

With reference to FIG. 16B, shown is a second drawing representing the progression of the toilet 300 being installed using the sealing assembly 1501. As compared to FIG. 16A, the toilet 300 has been lowered so that it contacts the finished floor 103. Additionally, the toilet horn receptacle 206 has forced the sealing rim 213 and the toilet horn receptacle 206 further towards the drain pipe 106. As a result, the sealing rim 213 has made a seal with the toilet 300. Thus, liquids and/or gases may be prevented from passing between the sealing assembly 1501 and the toilet 300.

Because the toilet horn receptacle 206 has been forced further towards the drain pipe 106, the funnel 209 has also been forced further into the closet collar 100 towards the drain pipe 106. Since the end of the channel wall 203 is attached to the closet collar flange 109, the portion of the sealing assembly 1501 that forms the funnel 209 has folded as shown, thereby shortening the length of the funnel 209. Additionally, the funnel 209 is forced into the closet collar 100 towards the drain pipe 106. As a result, the channel wall 203 is also forced into the closet collar 100 towards the drain pipe 106, thereby forcing the sealing component 226 to extrude from the channel 223 to the region between the channel 223 and the closet collar 100. Thus, liquids and/or gases may be prevented from passing between the closet collar 100 and the sealing assembly 1501.

Figure 17:
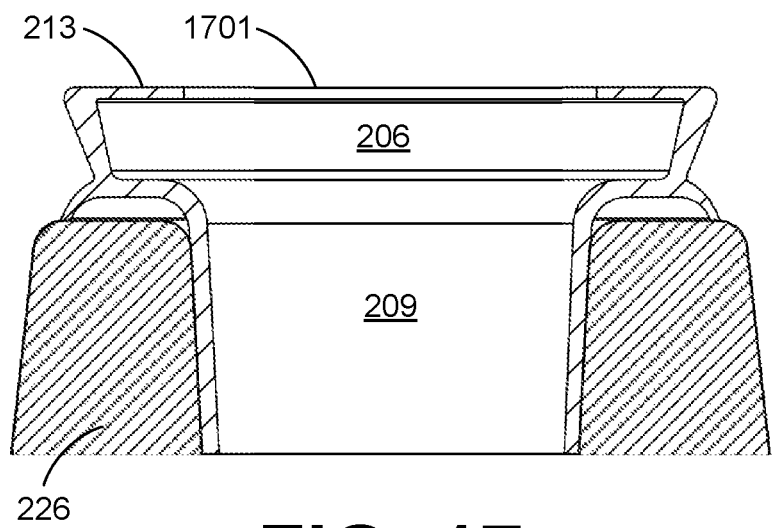
FIG. 17 is a drawing of an eleventh example of a sealing assembly for one or more of the closet collar installations of FIGS. 1A-1C according to various embodiments of the present disclosure.

With reference to FIG. 17, shown is another example of a sealing assembly 200, referred to herein as the sealing assembly 1701, according to various embodiments of the present disclosure. In particular, shown is a cross section of the sealing assembly 1701 positioned on a sealing component 226. The sealing assembly 1701 may be constructed out of, for example, a flexible membrane. In various embodiments, one or more rigid components may be attached to the flexible membrane to provide structural support for the various features of the sealing assembly 1701. The sealing component 226 shown in FIG. 17 comprises petrolatum, but any other suitable type of sealing component 226 that can be, for example, compressed or extruded may be used in alternative embodiments.

The sealing assembly 1701 in the embodiment shown in FIG. 17 includes the toilet horn receptacle 206, the funnel 209, and the sealing rim 213. However, the sealing assembly 1701 shown does not include a channel wall 203 that forms a channel 223. Instead, the portion of the sealing assembly 1701 that forms the funnel 209 is positioned within the opening of the sealing component 226, and the portion of the sealing assembly 1701 that forms the toilet horn receptacle 206 is positioned on the top surface of the sealing component 226. As shown, the length of the funnel 209 in various embodiments may extend from the top surface of the sealing component 226 to the bottom surface of the sealing component 226. In alternative embodiments, the funnel 209 may not extend all the way to the bottom surface of the sealing component 226, or the funnel 209 may extend further below the bottom surface of the sealing component 226.

In various embodiments, the sealing assembly 1701 may comprise or be associated with various types of components and/or features. For example, the sealing assembly 1701 may comprise or be associated with ears 216a-216b, a sealing assembly flange 900, multiple sealing components 226a-226b, a hoop 600, a sealed bladder 500, a cover 700, a ring 1006, and/or another type of component and/or feature.

Figure 18A:
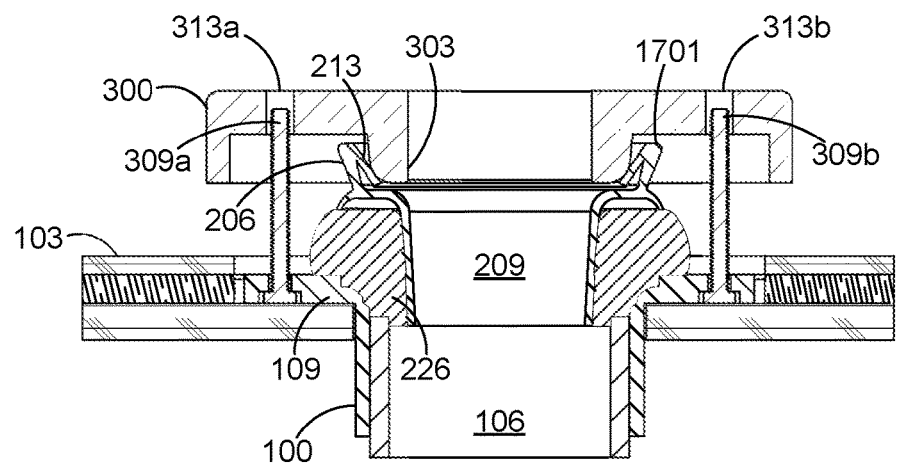
FIGS. 18A-18B are drawings depicting an installation of the sealing assembly of FIG. 17 according to various embodiments of the present disclosure.
Figure 18B:
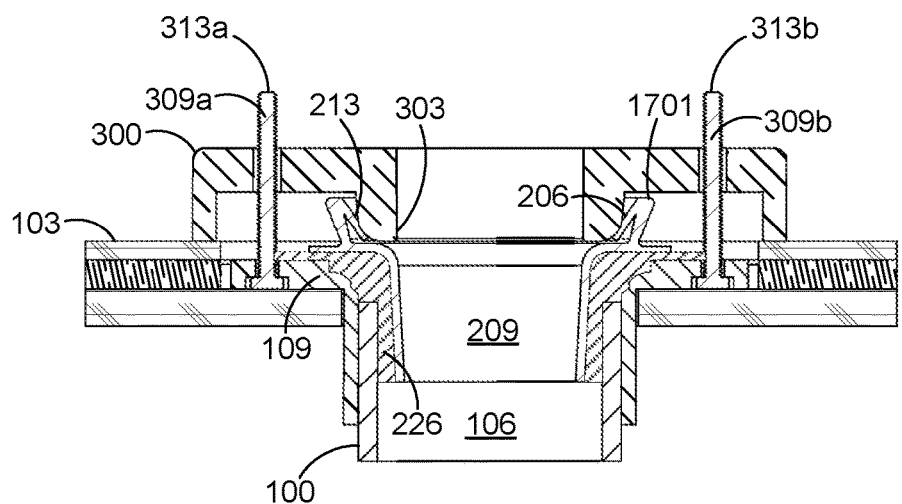

With reference to FIGS. 18A-18B, shown are cross-section views of a progression of a toilet 300 being installed over the closet collar 100 using the sealing assembly 1701 that is shown in FIG. 17. FIG. 18A shows the sealing assembly 1701 in relation to the sealing component 226 the closet collar 100, the finished floor 103, the drain pipe 106, and a portion of the toilet 300.

As shown, the toilet 300 has been positioned on the sealing assembly 1701 and lowered towards the finished floor 103. As a result, the sealing rim 213 has been flexed around the toilet horn 303 and forced downward towards the closet collar 100. As a result, the sealing rim 213 may make a seal with respect to the toilet 300.

Lowering the toilet 300 has also forced the toilet horn receptacle 206 and the funnel 209 of the sealing assembly 1701 downward towards the closet collar 100. As a result, at least a portion of the sealing component 226 may be extruded and forced into the region between the funnel 209 and the closet collar 100 because the sealing component 226 is positioned between the sealing assembly 1701 and the closet collar 100. The funnel 209 may restrict at least a portion of the sealing component 226 from being forced into the passageway for the drain pipe 106 and interfering with waste that passes through the funnel 209 to the drain pipe 106. Additionally, at least a portion of the sealing component 226 may be extruded and forced radially outward away from the funnel 209, as shown.

With reference to FIG. 18B, shown is a second drawing depicting the progression of the toilet 300 being installed using the sealing assembly 1701. As compared to FIG. 18A, the toilet 300 has been lowered so that is contacts the finished floor 103. Additionally, the toilet horn receptacle 206 and the funnel 209 of the sealing assembly 1701 have been forced further downward towards the drain pipe 106. As a result, more of the sealing component 226 has been extruded into the region between the funnel 209 and the closet collar 100, as compared to that which is shown in FIG. 18A. Additionally, more of the sealing component 226 has been forced radially outward with respect to the funnel 209. In particular, a portion the sealing component 226 has been forced outward and over the closet collar flange 109, as shown. Thus, liquids and/or gasses may be prevented from passing between the sealing assembly 1701 and the closet collar 100.

With reference to FIGS. 19A-19B, shown is another example of the sealing assembly 1701 according to various embodiments of the present disclosure. In particular, FIG. 19A shows a cross-section of the sealing assembly 1701 and the sealing component 226 with a shell 1903, and FIG. 19B shows a perspective view of the sealing assembly 1701 and the sealing component 226 with the shell 1903. The sealing assembly 1701 and the sealing component 226 shown in FIG. 18 are similar to the sealing assembly 1701 shown in FIG. 17.

The shell 1903 may surround at least a portion of the sealing component 226. According to various embodiments, the shell 1903 may comprise, for example, plastic, paper, and/or any other type of suitable material. The shell 1903 in various embodiments may comprise an outer wall 1906, an inner wall 1909 (not visible in FIG. 19B), a top wall 1913, and/or other components. The outer wall 1906 may be be continuously annular and cover at least a portion of the outer surface of the sealing component 226. The inner wall 1909 may be continuously annular and cover at least a portion of the inner surface of the sealing component 226. The top wall 1913 may cover the top surface of the sealing component 226 and connect the outer wall 1906 to the inner wall 1909. The outer wall 1906 may extend from the top wall 1913 to the bottom of the sealing component 226. The inner wall 1909 may or may not extend to the bottom of the sealing component 226 according to various embodiments.

The shell 1903 may include one or more lines 1916a-1916e that may circumscribe at least a portion of the outer wall 1906. The lines 1916a-1916e may comprise perforations, cuts, relatively thin wall thicknesses, or any type of feature that facilitates the shell 1903 being collapsed as will be described below.

With reference to FIGS. 20A-20C, shown are cross-section views depicting a progression of a toilet 300 being installed over the closet collar 100 using the sealing assembly 1701 and the shell 1903 that are shown in FIGS. 19A-19B. Beginning with FIG. 20A, shown is a first drawing depicting the progression of the toilet 300 being installed over the closet collar 100. FIG. 20A shows the sealing assembly 1701, the sealing component 226, and the shell 1903 in relation to the closet collar 100, the finished floor 103, the drain pipe 106, and a portion of the toilet 300.

As shown, the sealing component 226 with the shell 1903 has been positioned on the closet collar flange 109, and the sealing assembly 1701 has been poisoned on the shell 1903 with the funnel 209 inserted into the opening of the sealing component 226. As such, the bottom of the sealing component 226 and the shell 1903 may contact the closet collar flange 109. Additionally, it is noted that the sealing component 226 and the shell 1903 have not yet been deformed from the form shown in FIGS. 19A-19B.

As shown, the toilet 300 has been positioned over the sealing assembly 1701 so that the toilet horn 303 is aligned with the toilet horn receptacle 206. Additionally, the toilet bolt receptacles 313a-313b in the toilet 300 are aligned with the corresponding toilet bolts 309a-309b.

With reference to FIG. 20B, shown is a second drawing representing the progression of the toilet 300 being installed over the closet collar 100. As compared to FIG. 20A, the toilet 300 has been lowered towards the finished floor 103. As a result, the sealing rim 213 has been flexed around the toilet horn 303 and forced towards the closet collar 100.

Additionally, the toilet 300 has forced the sealing assembly 1701 downward towards the drain pipe 106. As a result, at portion of the sealing component 226 has been forced into the region between the funnel 209 and the closet collar 100. Additionally, the lowering of the toilet 300 has forced the shell 1903 to be compressed between the sealing assembly 1701 and the closet collar flange 109. As shown, the shell 1903 may collapse when compressed between the closet collar flange 109 and the sealing assembly 1701. In this regard, the shell 1903 may crack, fold, crumple, and/or flex about one or more of the lines 1916a-1916e when compressed between the sealing assembly 1701 and the closet collar flange 109. In this way, the shell 1903 may restrict at least a portion of the sealing component 226 from being forced out between the sealing assembly 1701 and the closet collar flange 109. Additionally, the shell 1903 may not prevent the sealing assembly 1701 from being lowered into the desired installed position.

With reference to FIG. 20C, shown is a third drawing depicting the progression of the toilet 300 being installed using the sealing assembly 1701 and the shell 1903. As compared to FIG. 20B, the toilet 300 has been lowered so that it contacts the finished floor 103. Additionally, the toilet 300 has forced the sealing assembly 1701 further towards the drain pipe 106. As a result, the funnel 209 has been forced further downward into the closet collar 100. Additionally, the sealing rim 213 has made a seal with respect to the toilet 300. Thus, liquids and/or gases may be prevented from passing between the sealing assembly 1701 and the toilet 300.

Furthermore, more of the sealing component 226 has been forced into the region between the funnel 209 and the closet collar 100. Some of the sealing component 226 may also be forced radially outward away from the funnel 209 and over the closet collar flange 109. Thus, liquids and/or gases may be prevented from passing between the sealing assembly 1701 and the toilet 300.

As shown, the shell 1903 has collapsed due to the toilet 300 being lowered into the position shown. Because the lines 1916a-1916e (not shown in FIG. 20C) have facilitated the shell 1903 being collapsed, the shell 1903 may not prevent the sealing assembly 1701 from being lowered into the position shown. In this regard, the shell 1903 may crack, fold, crumple, and/or flex so that the sealing assembly 1701 may be positioned as shown in FIG. 20C.

With reference to FIGS. 21A-21B, shown is another example of a sealing assembly 200, referred to herein as the sealing assembly 2101, according to various embodiments of the present disclosure. In particular, FIG. 21A shows an exploded view of the sealing assembly 2101 with a ring 1006 and a sealing assembly adapter 2103, and FIG. 21B shows a cross-section of the sealing assembly 200, the ring 1006, and the sealing assembly adapter 2103 in a partially assembled state, The sealing assembly 2101 shown in FIGS. 21A-21B is similar to the sealing assembly 200 shown in FIG. 8. For example, the sealing assembly 2101 forms a channel 223 in which a sealing component 226, such as petrolatum or any other type of sealing substance, can be disposed. Additionally, the channel 223 shown in FIGS. 21A-21B is formed between the funnel 209 and the channel wall 203. Furthermore, the channel wall 203 extends from the bottom of the toilet horn receptacle 206.

The ring 1006 in the embodiment shown in FIGS. 21A-21B may be rigid. As such, the ring 1006 may be constructed of, for example, polyvinylchloride (PVC) rubber, thermoplastic elastomer (TPE), thermoplastic rubber (TPR), styrene-butadiene rubber (SBR), ethylene propylene diene monomer (EPDM) rubber, acrylonitrile butadiene styrene (ABS) plastic, polyoxymethylene (POM) plastic, neoprene, foam rubber, silicone, and/or any other suitable material. The ring 1006 may comprise a groove 2106 that may comprise several holes. The groove 2106 and holes may facilitate attachment of the ring 1006 to the sealing assembly 2101 using, for example, an overmolding process. The ring 1006 may restrict the end of the channel wall 203 from deforming when the sealing assembly 2101 is compressed between the toilet 300 and the closet collar 100. Thus, the ring 1006 may facilitate maintaining the end of the channel wall 203 against the closet collar flange 109. In turn, this may prevent the sealing component 226 from being forced out between the sealing assembly 2101 and the closet collar flange 109. As a result, the sealing component 226 may be forced down between the funnel 209 and the closet collar 100.

In various embodiments, the ring 1006 may also comprise slots 2109a-2109b or ring holes 1009a-1009b through which the toilet bolts 309a-309b may be inserted. By having slots 2109a-2109b instead of ring holes 1009a-1009b, toilet bolts 309a-309b with various diameters and/or that are positioned at various distances from the center of the closet collar 100 may be compatible with the ring 1006.

Various embodiments of the sealing assembly 2101 may or may not use the sealing assembly adapter 2103. Various portions of the sealing assembly adapter 2103 may be flexible or rigid. As such, the sealing assembly adapter 2103 may be constructed of, for example, polyvinylchloride (PVC) rubber, thermoplastic elastomer (TPE), thermoplastic rubber (TPR), styrene-butadiene rubber (SBR), ethylene propylene diene monomer (EPDM) rubber, acrylonitrile butadiene styrene (ABS) plastic, polyoxymethylene (POM) plastic, neoprene, foam rubber, silicone, and/or any other suitable material. The sealing assembly adapter 2103 may be used, for example, in cases in which the distance between the finished floor 103 and the closet collar flange 109 is relatively large. In such cases, the sealing assembly adapter 2103 may facilitate forming a seal for the closet collar 100 while also maintaining a seal against the toilet 300.

In alternative embodiments, the sealing assembly adapter 2103 may be an integrally molded portion of the sealing assembly 2101. In this regard, the sealing assembly adapter 2103 and the sealing assembly 2101 may form a unitary component. In such embodiments, the sealing assembly adapter 2103 may be separated from the sealing assembly 2101 by a user tearing, cutting, or separating the sealing assembly adapter 2103 from the sealing assembly 2101 in any other suitable fashion.

The sealing assembly adapter 2103 in various embodiments may comprise an adapter funnel 2113, an adapter toilet horn receptacle 2116, an adapter sealing rim 2119, and/or other features. The adapter funnel 2113 is a portion of the sealing assembly adapter 2103 that is configured to insert into the passageway of the sealing assembly 2101 that is formed by the toilet horn receptacle 206 and/or the funnel 209 of the sealing assembly 2101. Additionally, the adapter funnel 2113 forms a passageway through which waste from the toilet 300 can flow. The adapter funnel 2113 may be a portion of the sealing assembly adapter 2103 that is relatively rigid as compared to one or more other portions of the sealing assembly adapter 2103.

The adapter toilet horn receptacle 2116 may be a portion of the sealing assembly adapter 2103 that is configured to receive the toilet horn 303 that is located on the bottom of the toilet 300. The adapter sealing rim 2119 may be a portion of the sealing assembly adapter 2103 that is configured to contact the toilet horn 303 and to form a seal for the toilet 300. As such, the portion of the sealing assembly adapter 2103 that forms the adapter sealing rim 2119 may be relatively flexible as compared to other portions of the sealing assembly adapter 2103.

With reference to FIGS. 22A-22B, shown are cross-section views depicting a progression of a toilet 300 being installed over the closet collar 100 using the sealing assembly 2101 and the sealing assembly adapter 2103 that are shown in FIGS. 21A-21B. Beginning with FIG. 22A, shown is a first drawing depicting the progression of the toilet 300 being installed over the closet collar 100. FIG. 22A shows the sealing assembly 2101 in relation to the closet collar 100, the finished floor 103, the drain pipe 106, the sealing assembly adapter 2103, and a portion of the toilet 300.

As shown in FIG. 22A, the sealing assembly 2101 has been positioned over the closet collar 100. It is noted that the sealing component 226 container in the channel 223 of the sealing assembly 2101 has not yet been deformed or extruded from the channel 223. In this regard, the sealing component 226 has the same shape and form as the sealing component 226 shown in FIG. 21B.

The toilet bolts 309a-309b that extend through the closet collar flange 109 of the closet collar 100 have been inserted through the slots 2109a-2009b of the ring 1006. Inserting the toilet bolts 309a-309b through the corresponding slots 2109a-2009b may facilitate the proper alignment of the sealing assembly 2101 with respect to the closet collar 100.

As shown, the adapter funnel 2113 of the sealing assembly adapter 2103 has been inserted into the toilet horn receptacle 206 of the sealing assembly 2101. To this end, at least a portion of the sealing rim 213 of the sealing assembly 2101 has been flexed downward towards the drain pipe 106.

Additionally, the toilet 300 is positioned over the sealing assembly adapter 2103 so that the toilet horn 303 is aligned with the adapter toilet horn receptacle 2116. Furthermore, the toilet bolt receptacles 313a-313b in the toilet 300 are aligned with the corresponding toilet bolts 309a-309b.

With reference to FIG. 22B, shown is a second drawing representing the progression of the toilet 300 being installed over the closet collar 100 using the sealing assembly 2101 and the sealing assembly adapter 2103. As shown, the toilet 300 has been lowered so that is contacts the finished floor 103. Additionally, the toilet horn receptacle 206 has flexed the inner portion of the adapter sealing rim 2119 downward towards the drain pipe 106. Thus, the adapter sealing rim 2119 of the sealing assembly adapter 2103 may form a seal with respect to the toilet 300.

As shown, the toilet 300 has also forced the sealing assembly adapter 2103 downward towards the drain pipe 106. The toilet 300 may force the sealing assembly adapter 2103 downward by, for example, being pressed against the adapter sealing rim 2119 and/or the portion of the sealing assembly adapter 2103 that forms the adapter toilet horn receptacle 2116. In response, the sealing assembly adapter 2103 has forced the sealing rim 213 and the toilet horn receptacle 206 of the sealing assembly 2101 downward towards the drain pipe 106. As a result, the sealing rim 213 has made a seal with respect to the sealing assembly adapter 2103. Thus, liquids and/or gases may be prevented from passing between the sealing assembly 2101, the sealing assembly adapter 2103, and the toilet 300.

Because the sealing assembly adapter 2103 has forced the toilet horn receptacle 206 further towards the drain pipe 106, the funnel 209 has also been forced further into the closet collar 100 towards the drain pipe 106. In turn, the channel wall 203 has been flexed about the bend 219 and/or at other locations. Thus, the sealing assembly 2101 has been compressed between the sealing assembly adapter 2103 and the closet collar 100. As a result, the sealing component 226 has been extruded from the sealing assembly 2101 to the region between the funnel 209 and the closet collar 100. Thus, liquids and/or gases may be prevented from passing between the sealing assembly 2101 and the closet collar 100.

With reference to FIG. 23, shown is a flowchart 2300 that provides an example of the operation of the sealing assembly 200, 1101, 1301, 1501, 1701, or 2101 according to various embodiments. In particular, the flowchart 2300 or 1701, or 2101 according to various embodiments. Although the flowchart 2300 shows a specific order of performance, it is understood that the order of performance may differ according to various embodiments. Additionally, various numbers shown in the flowchart 2300 may be skipped in various embodiments.

Beginning at number 2303, the sealing assembly 200, 1101, 1301, 1501, 1701, or 2101 is positioned on the closet collar 100. Next, the toilet 300 is positioned over the sealing assembly 200, 1101, 1301, 1501, 1701, or 2101 as shown at number 2306. The sealing assembly 200, 1101, 1301, 1501, 1701, or 2101 is then compressed between the toilet 300 and the closet collar 100, as indicated at number 2309. As shown at number 2313, the seal is then formed for the toilet 300 and/or the closet collar 100. In this regard, the sealing component 226 may be forced downward between the closet collar 100 and the funnel 209. For example, for embodiments in which the sealing component 226 comprises petrolatum, the petrolatum may be extruded to form a seal. As another example, if the sealing assembly 200, 1101, 1301, 1501, 1701, or 2101 comprises a sealed bladder 500, the sealed bladder 500 may be compressed and forced downward to form the seal against the closet collar 100.

It is emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A sealing apparatus, comprising:
   a flexible toilet horn receptacle wall;
   a flexible annular channel wall circumscribing the toilet horn receptacle wall, the annular channel wall and at least the toilet horn receptacle wall forming a continuous annular receptacle;
   a foam sealing component disposed in the continuous annular receptacle such that an inner wall of the foam sealing component circumscribes the toilet horn receptacle wall and such that the annular channel wall circumscribes at least a portion of an outer wall of the foam sealing component, the foam sealing component comprising a planar bottom surface extending between a bottom edge of the inner wall and a bottom edge of the outer wall, where the flexible toilet horn receptacle wall, flexible annular channel wall and foam sealing component deform when compressed between a toilet and a closet collar; and
   a sealing rim positioned at a first end of the toilet horn receptacle wall, wherein at least a portion of the sealing rim extends inwardly from the first end of the toilet horn receptacle wall towards a center axis of the sealing apparatus.

2. The sealing apparatus of claim 1, further comprising a funnel extending from a second end of the toilet horn receptacle wall.

3. The sealing apparatus of claim 2, wherein the funnel comprises a transition between the second end of the toilet horn receptacle wall and a lower portion of the funnel, the transition extending inward from the second end of the toilet horn receptacle wall towards the center axis of the sealing apparatus, wherein a first end of the transition has a first inner diameter corresponding to an inner diameter of the second end of the toilet horn receptacle wall and a second end of the transition has a second inner diameter less than the first inner diameter.

4. The sealing apparatus of claim 3, wherein the lower portion of the funnel is tapered.

5. The sealing apparatus of claim 2, further comprising an additional sealing component configured to be positioned between the foam sealing component and the closet collar, the additional sealing component comprising a planar top surface adjacent to the planar bottom surface of the foam sealing component, the additional sealing component circumscribing at least a portion of the funnel.

6. The sealing apparatus of claim 1, wherein the continuous annular receptacle is sealed at an upper end adjacent to the first end of the toilet horn receptacle wall and open at a lower end opposite the upper end.

7. The sealing apparatus of claim 6, wherein the upper end of the continuous annular receptacle is sealed between the toilet horn receptacle wall and the annular channel wall.

8. The sealing apparatus of claim 1, wherein the toilet horn receptacle wall tapers inward towards the center axis of the sealing apparatus from the first end to a second end.

9. The sealing apparatus of claim 1, wherein the sealing rim defines an opening having a diameter that is less than an inner diameter of the toilet horn receptacle wall at the first end.

10. The sealing apparatus of claim 9, wherein the sealing rim is configured to contact a horn of a toilet.

11. The sealing apparatus of claim 10, wherein the sealing rim flexes towards a second end of the toilet horn receptacle wall when contacted by the horn of the toilet.

12. The sealing apparatus of claim 1, wherein the sealing rim is oriented substantially perpendicular to the center axis of the sealing apparatus.

13. The sealing apparatus of claim 1, further comprising first and second ears extending outward from the annular channel wall.

14. The sealing apparatus of claim 13, wherein the first and second ears extend radially outward in opposite directions.

15. The sealing apparatus of claim 13, wherein the annular channel wall comprises a first end adjacent to the first end of the toilet horn receptacle wall and a second end opposite the first end, wherein the first and second ears extend outward from the second end of the annular channel wall.

16. The sealing apparatus of claim 1, wherein the continuous annular receptacle is defined by a one-piece structure comprising the toilet horn receptacle wall, the annular channel wall and the sealing rim.

17. The sealing apparatus of claim 16, wherein the one-piece structure further comprises a funnel extending from a second end of the toilet horn receptacle wall.

18. The sealing apparatus of claim 16, wherein the one-piece structure is constructed of at least one of thermoplastic elastomer (TPE), styrene-butadiene rubber (SBR), ethylene propylene diene monomer (EPDM) rubber, foam rubber, or silicone.

19. The sealing apparatus of claim 1, wherein the foam sealing component adheres to at least one surface of the continuous annular receptacle.

20. The sealing apparatus of claim 1, wherein the foam sealing component is a foam ring.

* * * * *